(12) United States Patent
Chia et al.

(10) Patent No.: US 10,503,314 B2
(45) Date of Patent: Dec. 10, 2019

(54) INTELLIGENT SENSING TOUCH DISPLAY DEVICE

(71) Applicants: IC array (Guang Zhou) Science & Technology Co., LTD, Guangzhou (CN); Rich IP Technology Inc., Taipei (TW)

(72) Inventors: Chung-Lin Chia, Taipei (TW); Han-Chang Chen, Taipei (TW); Jen-Chieh Chang, Taipei (TW); Yen-Hung Tu, Taipei (TW)

(73) Assignees: IC ARRAY (GUANG ZHOU) SCIENCE & TECHNOLOGY CO., LTD, Guangzhou (CN); RICH IP TECHNOLOGY INC., Taipei (TW)

( * ) Notice: Subject to any disclaimer, the term of this patent is extended or adjusted under 35 U.S.C. 154(b) by 0 days.

(21) Appl. No.: 16/261,294

(22) Filed: Jan. 29, 2019

(65) Prior Publication Data

US 2019/0155448 A1 May 23, 2019

Related U.S. Application Data

(63) Continuation-in-part of application No. 16/017,977, filed on Jun. 25, 2018, now Pat. No. 10,241,633, (Continued)

(51) Int. Cl.
*G06F 3/041* (2006.01)
*G09G 3/3208* (2016.01)
(Continued)

(52) U.S. Cl.
CPC ............ *G06F 3/0416* (2013.01); *G06F 3/044* (2013.01); *G06F 3/04817* (2013.01); (Continued)

(58) Field of Classification Search
CPC .... G06F 3/0416; G06F 3/044; G06F 3/04886; G06F 3/04817; G06F 2203/04102; G06F 3/046; G06F 3/043; G06F 3/042; G06F 2203/04106; G06F 3/0412; G06F 2203/04105; G06F 3/0414; (Continued)

(56) References Cited

U.S. PATENT DOCUMENTS

2013/0294358 A1* 11/2013 Kim ...................... H04W 72/12
370/329
2017/0255295 A1* 9/2017 Tanemura ............... G06F 3/044

* cited by examiner

*Primary Examiner* — Adam R. Giesy
(74) *Attorney, Agent, or Firm* — Guice Patents PLLC

(57) ABSTRACT

An intelligent sensing touch display device capable of being responsive to an application program to selectively perform a touch detection procedure on a first electrode group and/or on an active array unit, where a controller is coupled with a touch and display driving unit, the controller has a wireless communication port and/or a switching circuit for controlling at least one external device, and is used for performing a switching control procedure, the switching control procedure including steps of: receiving information of at least one touched button icon provided by the touch and display driving unit; generating at least one switching command according to the information of at least one touched button icon; and transmitting the at least one switching command via the wireless communication port and/or the switching circuit to control the at least one external device.

14 Claims, 31 Drawing Sheets

Related U.S. Application Data which is a continuation-in-part of application No. 15/398,671, filed on Jan. 4, 2017, now Pat. No. 10,032,061.

(51) Int. Cl.
*G06F 3/0481* (2013.01)
*G06F 3/0488* (2013.01)
*G06F 3/044* (2006.01)
G06F 3/042 (2006.01)
G06K 9/00 (2006.01)
G06F 3/043 (2006.01)
G06F 3/046 (2006.01)

(52) U.S. Cl.
CPC ....... *G06F 3/04886* (2013.01); *G09G 3/3208* (2013.01); *G06F 3/042* (2013.01); *G06F 3/043* (2013.01); *G06F 3/046* (2013.01); *G06F 3/0412* (2013.01); *G06F 2203/04102* (2013.01); *G06F 2203/04106* (2013.01); *G06K 9/00013* (2013.01); *G09G 2380/02* (2013.01)

(58) Field of Classification Search
CPC ............ G06F 3/041661; G09G 3/3208; G09G 2380/02; G06K 9/00013
See application file for complete search history.

INTELLIGENT SENSING TOUCH DISPLAY DEVICE

INCORPORATION BY REFERENCE

This is a continuation in part application to application Ser. No. 16/017,977 "INTELLIGENT SENSING TOUCH DISPLAY DEVICE" which was filed on Jun. 25, 2018, and which is incorporated herein by reference in its entirety.

BACKGROUND OF THE INVENTION

Field of the Invention

The present invention relates to a touch sensing device, especially to an intelligent touch sensing device.

Description of the Related Art

Please refer to FIG. 1, which illustrates a touch detection scheme of prior art using a plurality of polysilicon thin film transistors and a plurality of capacitive electrodes to form a fingerprint scan matrix on a glass substrate or a polymer substrate. As illustrated in FIG. 1, the polysilicon thin film transistors of the fingerprint scan matrix are sequentially driven to scan each of the capacitive electrodes, thereby deriving fingerprint matrix data.

However, when the fingerprint scan matrix is applied in high resolution or large size products, the scan time thereof will increase substantially due to a much increased number of detection points. Besides, if the fingerprint scan matrix is stacked on a display, the light transmittance rate of the display will be compromised, so generally the fingerprint scan matrix is installed at a zone outside the display (as shown in FIG. 1) for identity authentication via fingerprint detection.

Please refer to FIG. 2, which illustrates another touch detection scheme of prior art using a plurality of common electrodes of a display to form a touch scan matrix. As illustrated in FIG. 2, to wire the touch scan matrix, a large number of conductors and connecting pads have to be installed thereon. When the touch scan matrix is required to possess a high resolution or a large matrix size, the scan time thereof will increase substantially due to a much increased number of detection points, and when the touch scan matrix possesses a high resolution, the pattern of the common electrodes may overlap the pattern of pixel electrodes of the display to result in a moiré effect, thereby degrading the display quality thereof.

That is, when a touch module is required to provide a high resolution touch detection function, the efficiencies of traditional touch detection schemes remain room to be improved, and when a touch display module is required to provide both a high resolution display and a high resolution touch detection function, traditional touch display schemes are hard to achieve both the high resolution touch detection function and the high resolution display quality.

To solve the foregoing problems, a novel touch sensing device is needed.

SUMMARY OF THE INVENTION

One objective of the present invention is to disclose an intelligent touch sensing device, which is capable of integrating a high resolution active type sensing structure and a low resolution passive type sensing structure into a touch detection device, so as to perform a first touch detection procedure and/or a second touch detection procedure as optionally required by an application program.

Another objective of the present invention is to disclose an intelligent touch sensing device, which is capable of providing fingerprint data or fingerprint characteristic data.

Another objective of the present invention is to disclose an intelligent touch sensing device, which is capable of providing sensed pressure data.

Another objective of the present invention is to disclose an intelligent touch sensing device, which is capable of utilizing existing control lines, signal lines, transistor switches, pixel electrodes, and counter electrodes of a matrix display structure to perform a touch detection procedure, thereby providing a high yield rate and low cost touch sensing device.

Another objective of the present invention is to disclose an intelligent touch sensing device, which is capable of providing a joystick style operation zone within a touch detection area.

Another objective of the present invention is to disclose an intelligent touch sensing device, which is capable of being implemented in a form of a curved touch sensing device or a flexible or foldable touch sensing device by utilizing a manufacturing process for organic transistors and a flexible substrate.

Another objective of the present invention is to disclose an intelligent sensing touch display device capable of providing a variety of touch display modes according to requirements of different application programs.

Another objective of the present invention is to disclose an intelligent sensing touch display device, which is capable of providing an AC channel touch sensing unit consisting of plural discrete electrodes, where when any electrode of the plural discrete electrodes in the AC channel touch sensing unit is touched by a finger, a signal will be detected by a touch and display driving unit to indicate that the AC path touch sensing unit is touched.

Another objective of the present invention is to disclose an intelligent sensing touch display device, which is capable of providing a flexible touch display surface by using a flexible substrate to carry discrete electrodes of a common voltage layer.

Another objective of the present invention is to disclose an intelligent sensing touch display device, which is capable of providing a functional power for a display driving function or a touch sensing function by using at least one auxiliary capacitor when the intelligent sensing touch display device is disconnected from a power supply.

Another objective of the present invention is to disclose an intelligent sensing touch display device, which is capable of using adjustable power sources to control a brightness distribution of a display image by connecting the adjustable power sources with discrete electrodes of a common voltage layer.

Another objective of the present invention is to disclose an intelligent sensing touch display device, which is capable of integrating one or more sensing elements of the group consisting of photosensitive element, electromagnetic sensing element, and pressure sensing element.

Another objective of the present invention is to disclose an intelligent sensing touch display device, which is capable of providing a smart switching function and saving much energy and many processing resources of a main controller.

Still another objective of the present invention is to disclose an intelligent sensing touch display device, which is capable of saving much energy and many processing resources of a touch and display driving unit.

To attain the foregoing objectives, an intelligent touch sensing device is proposed, including:

a first electrode group having a first plurality of first electrodes;

a second electrode group having a second plurality of second electrodes, each of the second electrodes being controlled by at least one active switch to determine whether to couple with a touch sensing signal, and the second plurality being larger than the first plurality; and a touch detection unit coupled with the first electrode group and the second electrode group, used for operating according to an application program to optionally perform a first touch detection procedure on the first electrode group, perform a second touch detection procedure on the second electrode group, or perform the first detection procedure on the first electrode group and then perform the second touch detection procedure on at least one region of the second electrode group, wherein the at least one region is determined according to a detection result of the first touch detection procedure.

In one embodiment, the first electrode group and the second electrode group are on a same plane, and the first touch detection procedure is a first acoustic wave type touch detection procedure or a first capacitive type touch detection procedure or a first electromagnetic induction type touch detection procedure, and the second touch detection procedure is a second acoustic wave type touch detection procedure or a second capacitive type touch detection procedure or a second electromagnetic induction type touch detection procedure.

In one embodiment, the first electrode group and the second electrode group are on different planes, and the first touch detection procedure is a first acoustic wave type touch detection procedure or a first capacitive type touch detection procedure or a first electromagnetic induction type touch detection procedure, and the second touch detection procedure is a second acoustic wave type touch detection procedure or a second capacitive type touch detection procedure or a second electromagnetic induction type touch detection procedure.

In one embodiment, the touch detection unit outputs first touch sensed data of the first electrode group and/or second touch sensed data of the second electrode group, and/or fusion data of the first touch sensed data and the second touch sensed data.

In one embodiment, both the first touch sensed data and the second touch sensed data are touch coordinate data.

In one embodiment, the first touch sensed data are touch coordinate data and the second touch sensed data are raw data of sensed values that are generated without going through a touch coordinate determining procedure.

In one embodiment, both the first touch sensed data and the second touch sensed data are raw data of sensed values that are generated without going through a touch coordinate determining procedure.

In one embodiment, both the first touch sensed data and the second touch sensed data are processed data of raw data of sensed values.

In one embodiment, the application program is a fingerprint detection program, and the touch detection unit generates fingerprint data after executing the fingerprint detection program, wherein, the fingerprint data are raw data derived after the touch detection unit executes the first touch detection procedure and the second touch detection procedure, the raw data being not coordinate data generated by a touch coordinate determining procedure; or the fingerprint data are processed data derived after the touch detection unit executes the first touch detection procedure, the second touch detection procedure, and a fingerprint characteristics retrieving procedure.

In one embodiment, the application program is a pressure detection program for generating pressure value data and/or pressure vector data according to raw data of sensed values derived after performing the first touch detection procedure and the second touch detection procedure, the raw data being generated without going through a touch coordinate determining procedure.

In one embodiment, the touch detection unit generates pressure value data and/or coordinate data according to a detection result of the first touch detection procedure, and generates fingerprint data and/or fingerprint characteristics data according to a detection result of the second touch detection procedure.

In one embodiment, the touch detection unit generates coordinate data according to a detection result of the first touch detection procedure, and generates fingerprint characteristics data and/or pressure value data according to a detection result of the second touch detection procedure.

To attain the foregoing objectives, another intelligent touch sensing device is proposed, including:

a first electrode group having a first plurality of first electrodes;

an active matrix unit having a second plurality of second electrodes, each of the second electrodes being addressable by at least one active switch to serve as a display electrode or a touch sensing electrode, wherein the second plurality is larger than the first plurality;

a display material layer corresponding with a plurality of pixel units, used to be driven by the active matrix unit with voltage signals or current signals to provide a display image during a display procedure; and a touch detection unit coupled with the first electrode group and the active matrix unit, used for operating according to an application program to optionally perform a first touch detection procedure on the first electrode group, perform a second touch detection procedure on the active matrix unit, or perform the first detection procedure on the first electrode group and then perform the second touch detection procedure on at least one region of the active matrix unit, wherein the at least one region is determined according to a detection result of the first touch detection procedure.

In one embodiment, the first electrode group and the active matrix unit are on a same plane.

In one embodiment, the first electrode group and the active matrix unit are on different planes.

In one embodiment, the touch detection unit performs the first touch detection procedure on a plurality of the first electrodes corresponding to a plurality of the pixel units not yet driven during the display procedure, the pixel units being set to be sequentially driven during the display procedure.

In one embodiment, the first electrodes and the second electrodes are coupled to the touch detection unit and a display driving unit via a multiplexing circuit or a bus circuit, and the first electrodes and the second electrodes are located at two different sides or a same side of the display material layer.

In one embodiment, the touch detection unit outputs first touch sensed data of the first electrode group and/or second touch sensed data of the active matrix unit, wherein, both the first touch sensed data and the second touch sensed data are touch coordinate data, or the first touch sensed data are touch coordinate data and the second touch sensed data are raw data of sensed values that are generated without going through a touch coordinate determining procedure, or both the first touch sensed data and the second touch sensed data are raw data of sensed values that are generated without going through a touch coordinate determining procedure.

In one embodiment, the application program is a fingerprint detection program, and the touch detection unit generates fingerprint data after executing the fingerprint detection program, wherein, the fingerprint data are raw data derived after the touch detection unit executes the first touch detection procedure and the second touch detection procedure, the raw data being not coordinate data generated by a touch coordinate determining procedure; or the fingerprint data are processed data derived after the touch detection unit executes the first touch detection procedure, the second touch detection procedure, and a fingerprint characteristics retrieving procedure.

In one embodiment, the application program is a pressure detection program for generating pressure value data and/or pressure vector data according to raw data of sensed values derived after performing the first touch detection procedure and the second touch detection procedure, the raw data being generated without going through a touch coordinate determining procedure.

In one embodiment, the touch detection unit generates pressure value data and/or coordinate data according to a detection result of the first touch detection procedure, and generates fingerprint data and/or fingerprint characteristics data according to a detection result of the second touch detection procedure.

In one embodiment, the touch detection unit generates coordinate data according to a detection result of the first touch detection procedure, and generates fingerprint characteristics data and/or pressure value data according to a detection result of the second touch detection procedure.

In one embodiment, the first touch detection procedure is a first acoustic wave type touch detection procedure or a first capacitive type touch detection procedure, and the second touch detection procedure is a second acoustic wave type touch detection procedure or a second capacitive type touch detection procedure.

In one embodiment, the first electrode group and the active matrix unit are used for detecting a touch operation on a single touch zone of the intelligent touch sensing device, or for detecting two touch operations separately on a first touch zone and a second touch zone of the intelligent touch sensing device, and the first touch zone and the second touch zone are on a same plane or on different planes.

In one embodiment, the touch detection unit performs a data fusion procedure on first touch sensed data derived from the first electrode group and on second touch sensed data derived from the active matrix unit to generate data of a fusion image, wherein both the first touch sensed data and the second touch sensed data are raw data of sensed values generated without going through a touch coordinate determining procedure.

To attain the foregoing objectives, an intelligent sensing touch display device is proposed, including:

a first electrode group having N first electrodes on a first plane, N being a positive integer;

an interface layer, which is a display material layer or a display and touch sensing material layer, located below the first electrode group for providing a display area on the display material layer, or providing a display area and at least one touch sensing area on the display and touch sensing material layer;

an active array unit having N second electrode units on a second plane located below the display material layer, each of the second electrode units having M second electrodes, each of the M second electrodes being controlled by at least one active switch and opposite to one said first electrode, M being a positive integer greater than 1, wherein when the interface layer is the display material layer, each of the second electrodes is used as a display electrode or a touch sensing electrode, and when the interface layer is the display and sensing material layer, a part of the second electrodes are used as display electrodes or touch sensing electrodes, and another part of the second electrodes are used as the touch sensing electrodes, the touch sensing electrode being a capacitive electrode, a photosensitive electrode, or a thermal sensing electrode; and a touch and display driving unit coupled with the first electrode group and the active array unit for generating voltage signals or current signals to drive the interface layer to provide a display image, and/or for being responsive to an application program to selectively perform a first touch detection procedure on the first electrode group, or performing a second touch detection procedure on the active array unit, or performing the first touch detection procedure on the first electrode group, and then performing the second touch detection procedure on at least one area of the active array unit, wherein the at least one area is determined according to a detection result of the first touch detection procedure;

wherein one said first electrode and the M second electrodes form an AC channel touch sensing unit, so that the touch and display driving unit will recognize that the AC path touch sensing unit is touched when any electrode in the AC channel touch sensing unit is touched by a finger.

In one embodiment, the display material layer is an OLED material layer or a QDLED material layer, and the display material layer is of top emission type or bottom emission type.

In one embodiment, the touch and display driving unit drives one AC path touch sensing unit in a self-capacitance mode or drives two adjacent AC path touch sensing units in a mutual-capacitance mode, or drives at least two adjacent AC path touch sensing units in an electrostatic field sensing mode.

In one embodiment, the intelligent sensing touch display device further includes a connection circuit for connecting a plurality of the first electrodes to form a combined AC path touch sensing unit under a control of the touch and display driving unit.

In one embodiment, the intelligent sensing touch display device further includes at least one side electrode neighboring the first electrode group for cooperating with the first electrode group to provide a mutual-capacitance touch detection mode, or an electrostatic field sensing mode.

In one embodiment, the display and sensing material layer includes at least one photosensitive element.

In one embodiment, the intelligent sensing touch display device further includes at least one photosensitive element, wherein the photosensitive element is vertically aligned with a first light-transmitting region of the first electrode group, a light-transmitting region of the interface layer and a second light-transmitting region of the active array unit.

In one embodiment, the intelligent sensing touch display device further includes at least one electromagnetic sensing element, and the electromagnetic sensing element is an additional sensing element adjacent to the active array unit.

In one embodiment, the intelligent sensing touch display device further includes at least one pressure sensing element, and the pressure sensing element is an additional sensing element adjacent to the active array unit.

In one embodiment, the intelligent sensing touch display device further includes at least one sound wave sensing element, and the sound wave sensing element is an additional sensing element adjacent to the active array unit.

In one embodiment, the first plane and the second plane are provided by two flexible substrates, the flexible substrate being a flexible PI substrate or a flexible PET substrate, so that the intelligent sensing touch display device is a flexible touch display device.

In one embodiment, the intelligent sensing touch display device further includes at least one multiplexer for connecting at least one said first electrode to an adjustable power source or the touch and display driving unit.

In one embodiment, the adjustable power source is used for controlling a brightness distribution of the display area.

In one embodiment, the intelligent sensing touch display device further includes at least one auxiliary capacitor for providing a functional power for a display driving function or a touch sensing function when the intelligent sensing touch display device is disconnected from a power supply.

To attain the foregoing objectives, an intelligent sensing touch display device is proposed, including:

a first electrode group having N first electrodes on a first plane, N being a positive integer;

an interface layer, which is a display material layer or a display and touch sensing material layer, located below the first electrode group for providing a display area on the display material layer, or providing a display area and at least one touch sensing area on the display and touch sensing material layer;

an active array unit having N second electrode units on a second plane located below the display material layer, each of the second electrode units having M second electrodes, each of the M second electrodes being controlled by at least one active switch and opposite to one said first electrode, M being a positive integer greater than 1, wherein when the interface layer is the display material layer, each of the second electrodes is used as a display electrode or a touch sensing electrode, and when the interface layer is the display and sensing material layer, a part of the second electrodes are used as display electrodes or touch sensing electrodes, and another part of the second electrodes are used as the touch sensing electrodes, the touch sensing electrode being a capacitive electrode, a photosensitive electrode, or a thermal sensing electrode; and a touch and display driving unit coupled with the first electrode group and the active array unit for generating voltage signals or current signals to drive the interface layer to provide a display image, and/or for being responsive to an application program to selectively perform a first touch detection procedure on the first electrode group, or performing a second touch detection procedure on the active array unit, or performing the first touch detection procedure on the first electrode group, and then performing the second touch detection procedure on at least one area of the active array unit, wherein the at least one area is determined according to a detection result of the first touch detection procedure;

wherein a controller is coupled with the touch and display driving unit, the controller has a wireless communication port and/or a switching circuit for controlling at least one external device, and is used for performing a switching control procedure, the switching control procedure including steps of: receiving information of at least one touched button icon provided by the touch and display driving unit; generating at least one switching command according to the information of at least one touched button icon; and transmitting the at least one switching command via the wireless communication port and/or the switching circuit to control the at least one external device.

For possible embodiments, the controller can be integrated with the touch and display driving unit in a COG chip, COF chip or COB chip.

For possible embodiments, the controller can be integrated with a main controller in a COG chip, COF chip or COB chip, and the main controller can be a CPU or GPU.

For possible embodiments, the controller can be integrated with the touch and display driving unit and a main controller in a COG chip, COF chip or COB chip, and the main controller can be a CPU or GPU.

In addition, the present invention further proposes an intelligent sensing touch display system, including:

a plurality of the intelligent sensing touch display devices as disclosed above, wherein each of the intelligent sensing touch display devices has a master interface and a slave interface, and the plurality of the intelligent sensing touch display devices are connected in a chain by connecting the master interface of one said intelligent sensing touch display device with the salve interface of another said intelligent sensing touch display device; and a main controller, coupled with a first intelligent sensing touch display device of the plurality of the intelligent sensing touch display devices for receiving at least one said switching command, and driving at least one external apparatus accordingly.

For possible embodiments, the controller can be integrated with the touch and display driving unit in a COG chip, COF chip or COB chip.

For possible embodiments, the main controller can be a CPU or GPU.

In addition, the present invention further proposes an electronic apparatus including the intelligent sensing touch display device as disclosed above, and the electronic apparatus can be a portable computer, a vehicle electronic system, an intelligent watch, a remote controller, a button with display, an IOT, or a fingerprint display.

In addition, the present invention further proposes an electronic apparatus including the intelligent sensing touch display system as disclosed above, and the electronic apparatus can be a portable computer, a vehicle electronic system, an intelligent watch, a remote controller, a button with display, an IOT, or a fingerprint display.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

Figure 1:
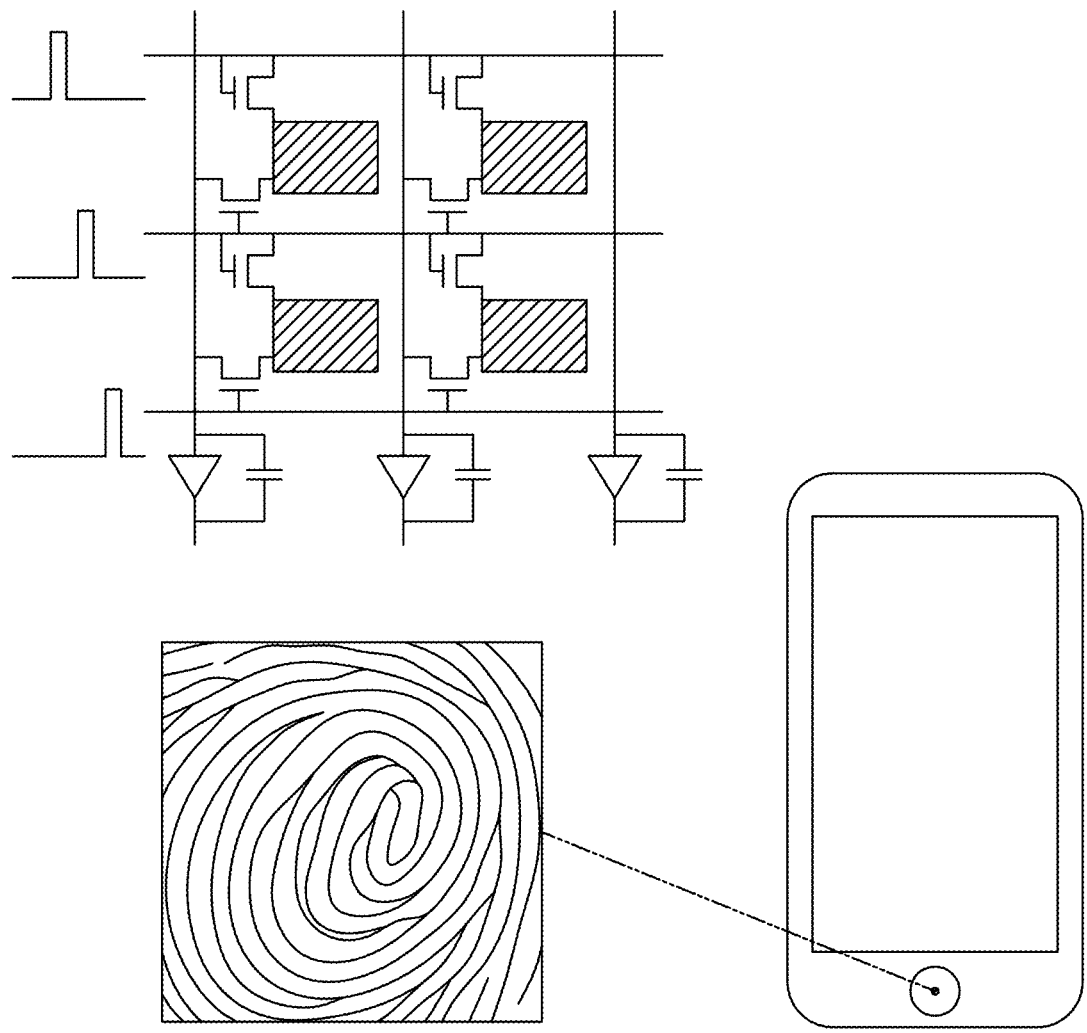
FIG. 1 illustrates a touch detection scheme of prior art using a plurality of polysilicon thin film transistors and a plurality of capacitive electrodes to form a fingerprint scan matrix on a glass substrate or a polymer substrate.
Figure 2:
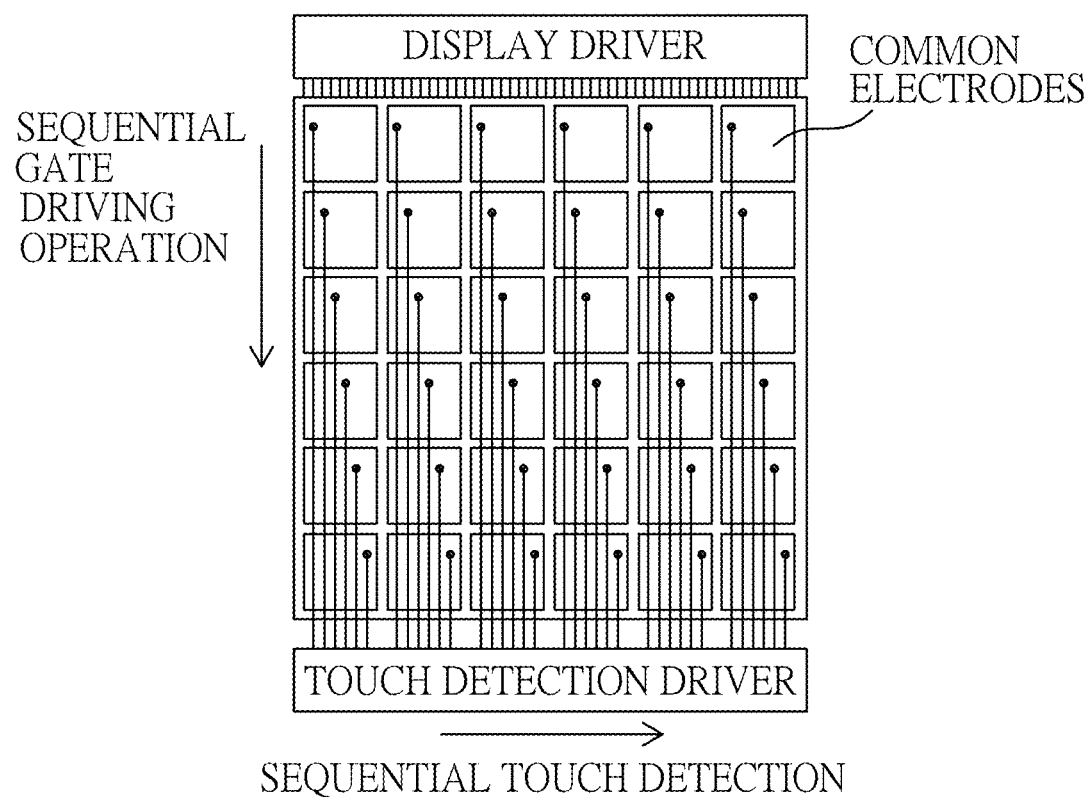
FIG. 2 illustrates another touch detection scheme of prior art using a plurality of common electrodes of a display to form a touch scan matrix.
Figure 3:
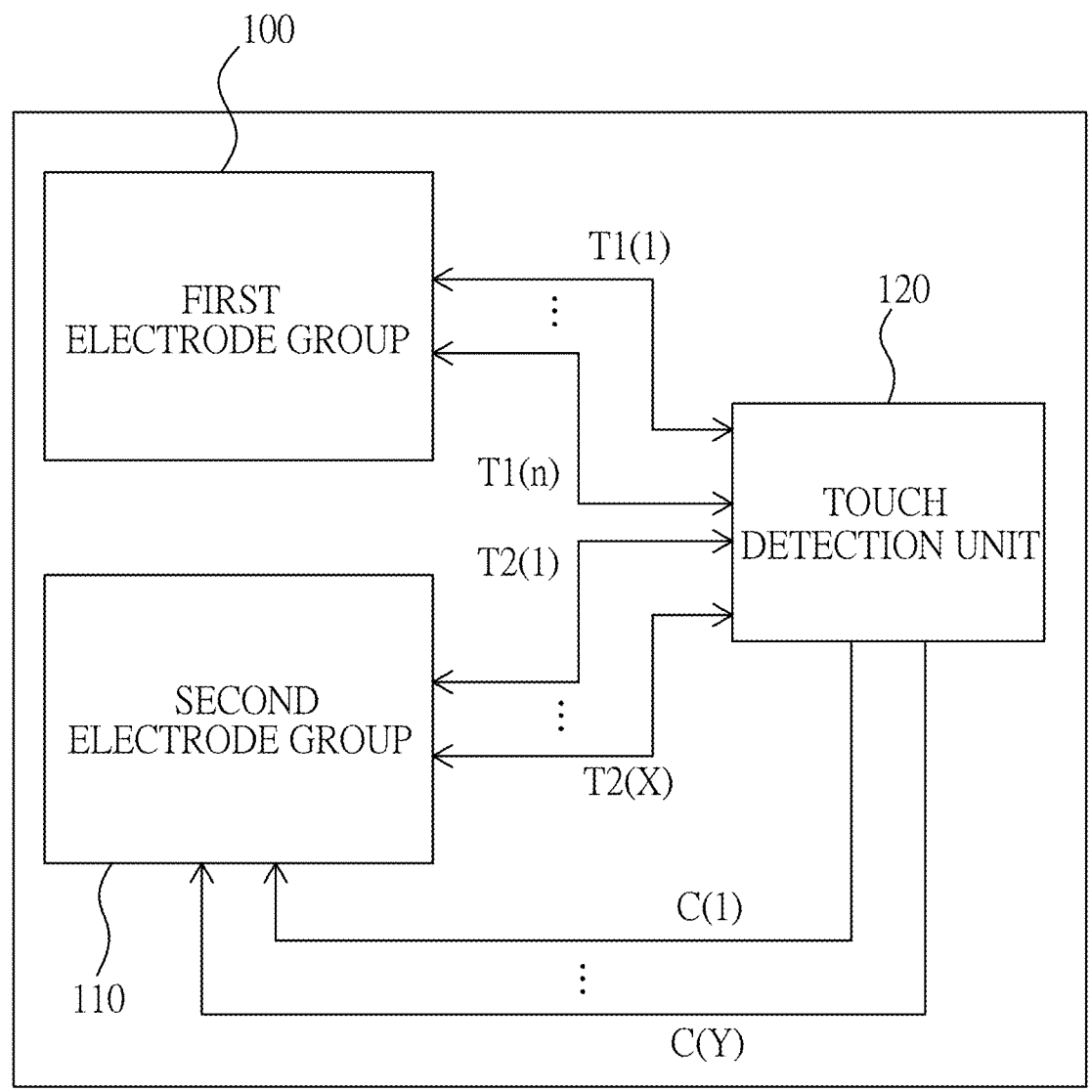
FIG. 3 illustrates a block diagram of an intelligent touch sensing device according to an embodiment of the present invention.
Figure 4A:
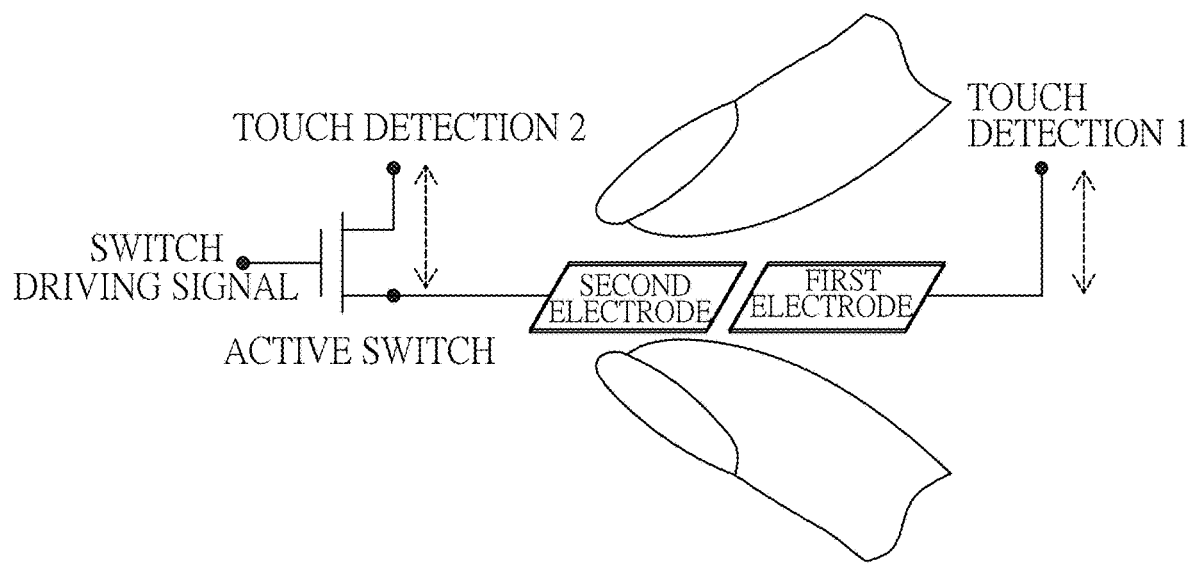
FIG. 4a-4f illustrates 6 embodiments of the first electrode group and the second electrode group of the intelligent touch sensing device of FIG. 3.
Figure 4B:
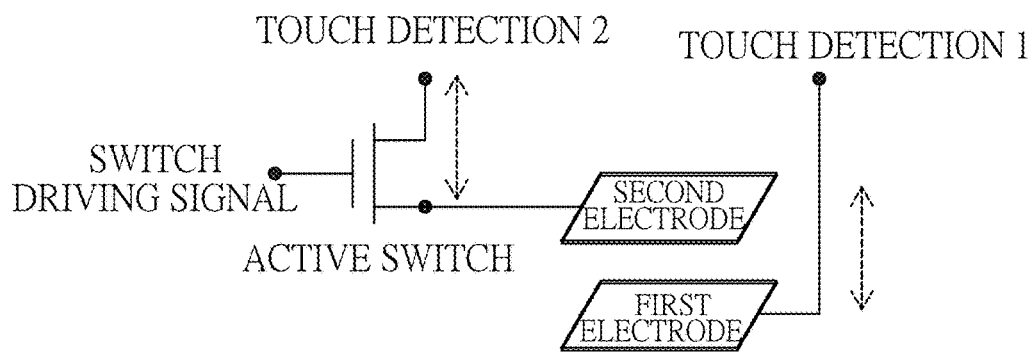
Figure 4C:
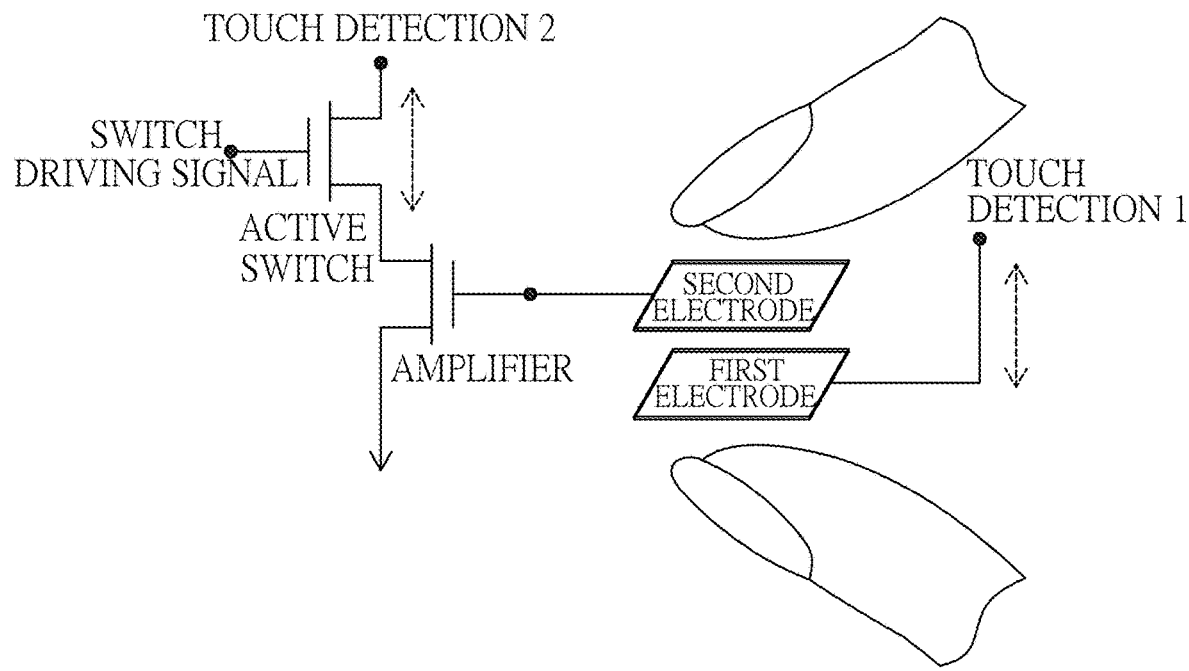
Figure 4D:
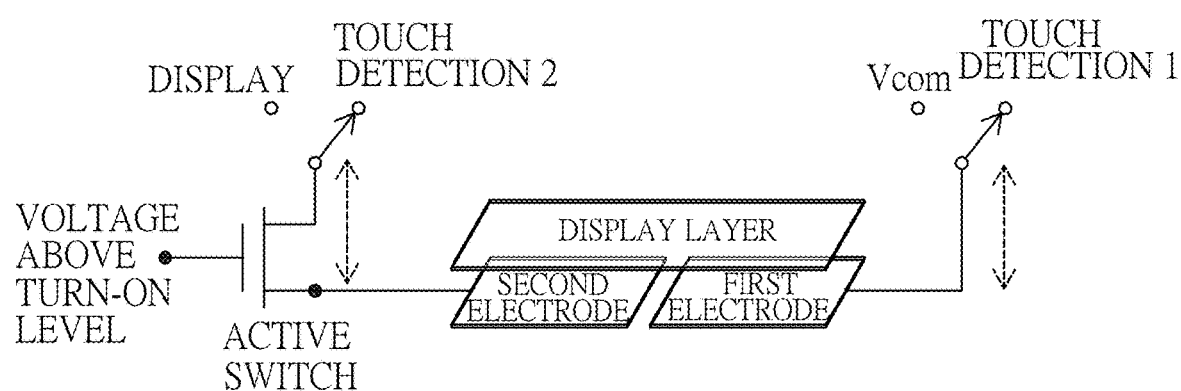
Figure 4E:
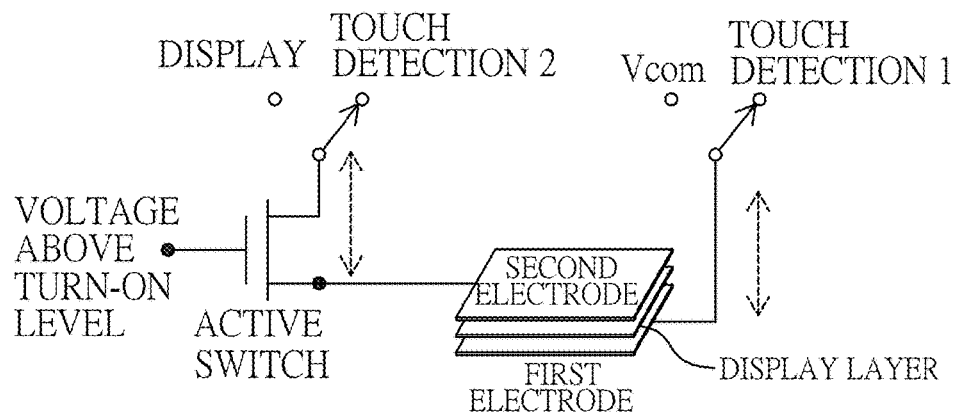
Figure 4F:
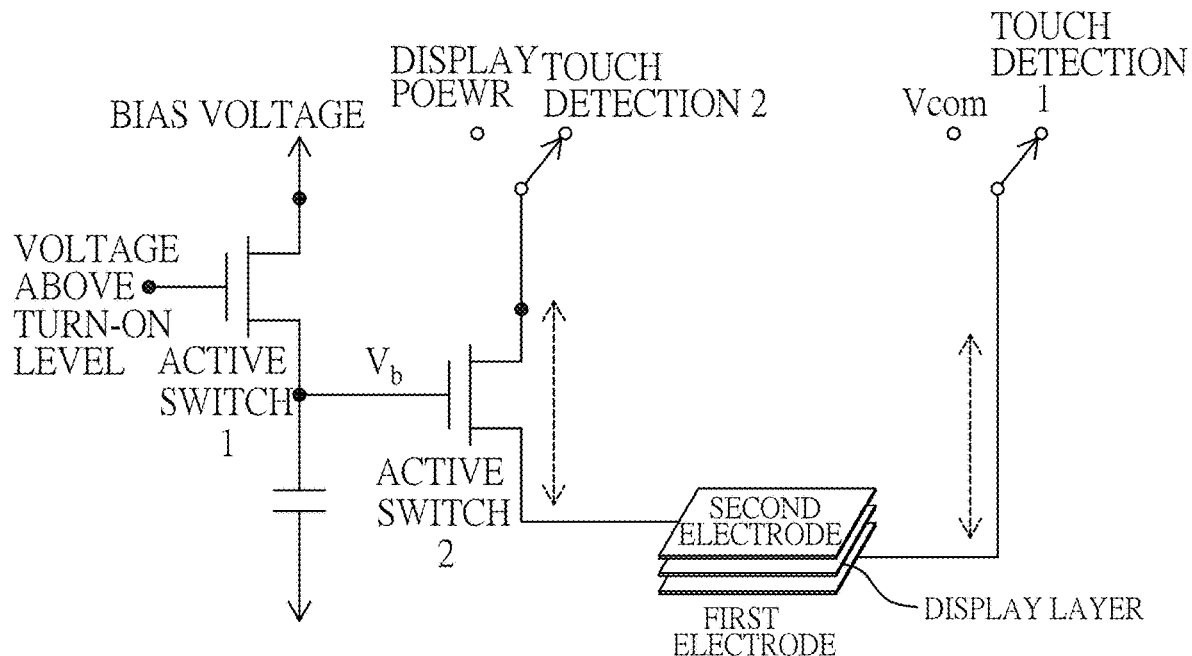
Figure 5A:
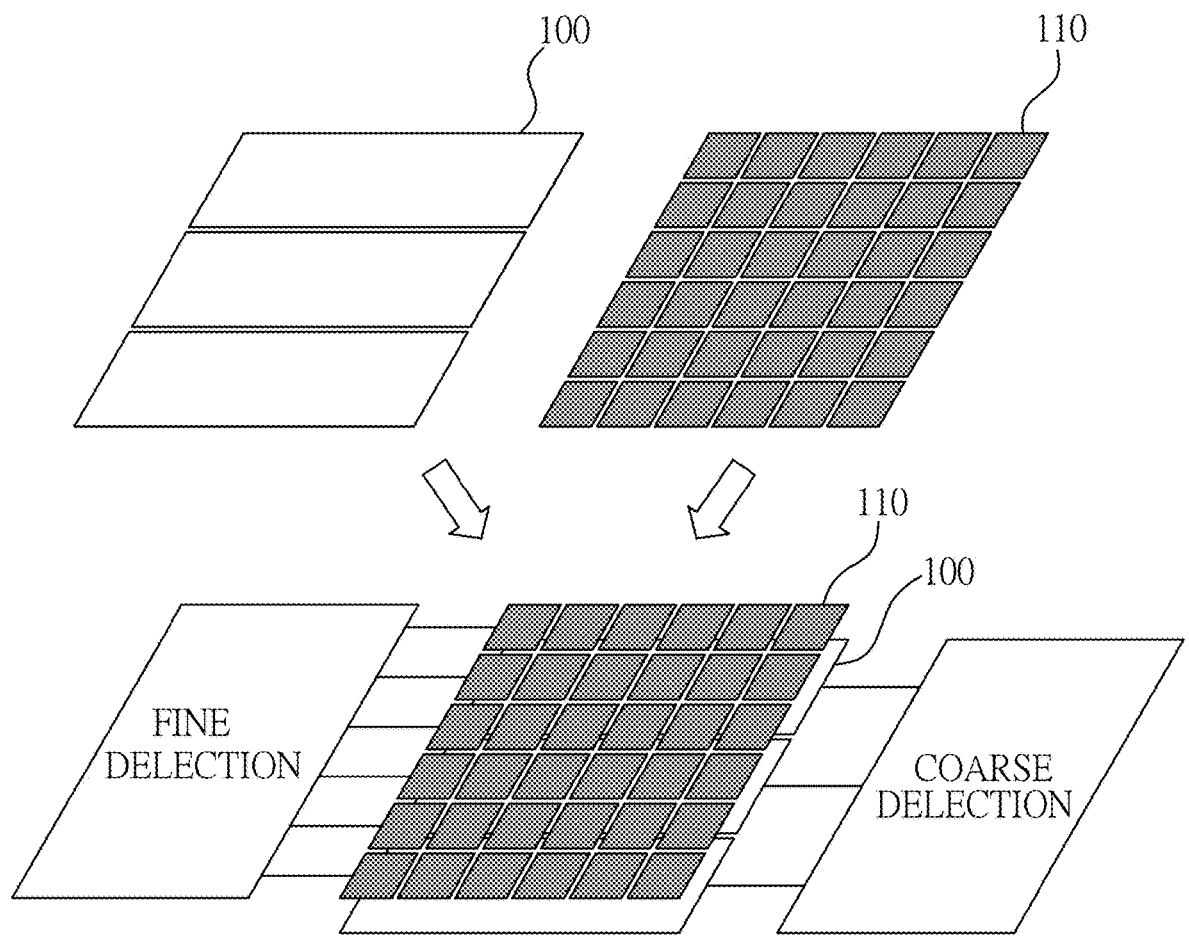
FIG. 5a-5b illustrates a scenario that the first electrode group and the second electrode group of the intelligent touch sensing device of FIG. 3 are on different planes and a scenario that the first electrode group and the second electrode group of the intelligent touch sensing device of FIG. 3 are on a same plane.
Figure 5B:
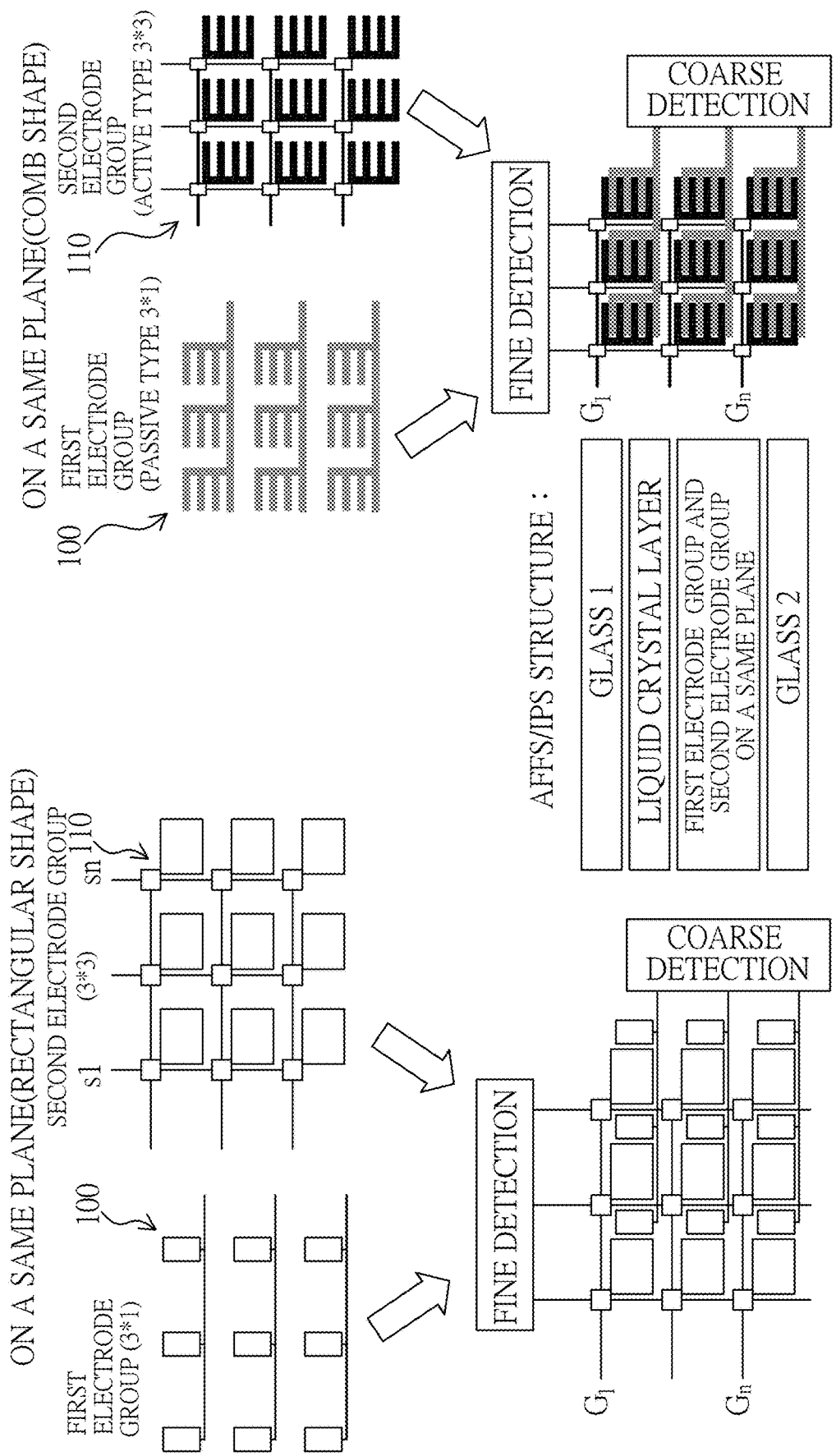
Figure 6A:
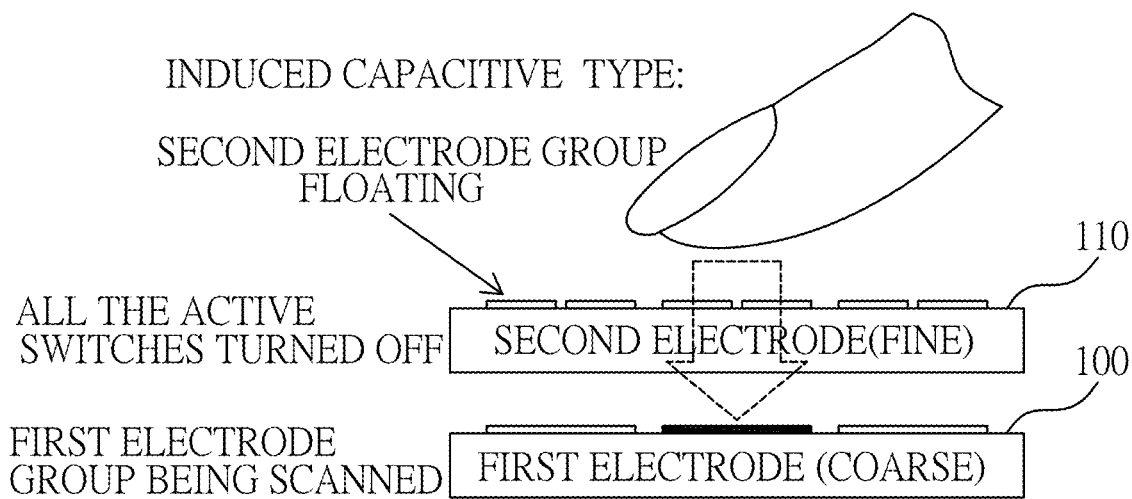
FIG. 6a-6j illustrates scenarios that the intelligent touch sensing device of FIG. 3 provides single-side touch operation or double-sides touch operation, and the first electrode group and the second electrode group use same type of touch detection scheme or different types of touch detection scheme.
Figure 6B:
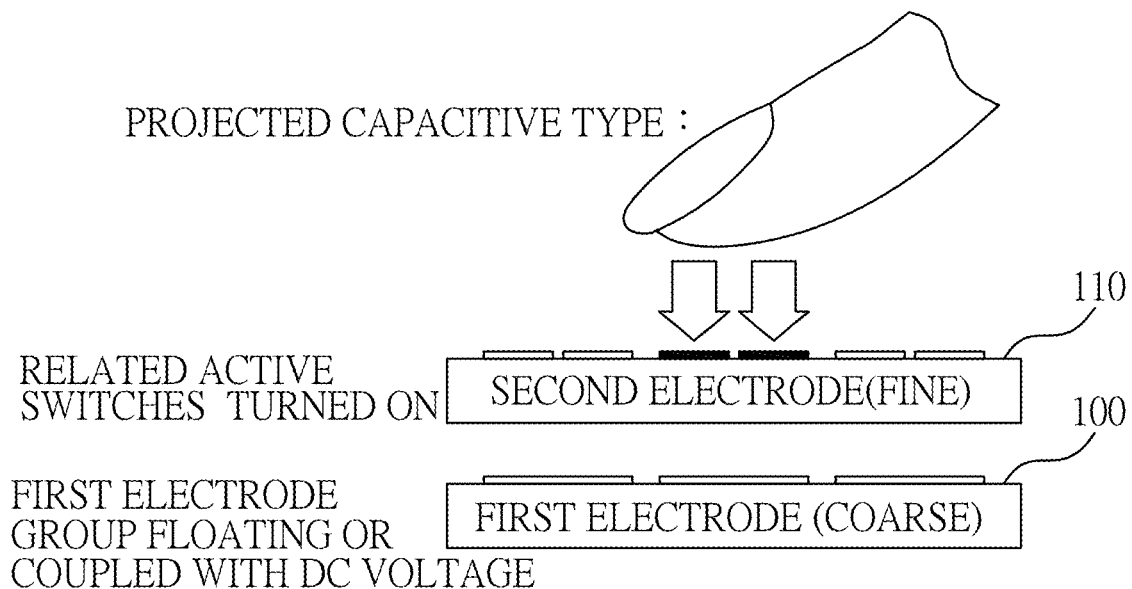
Figure 6C:
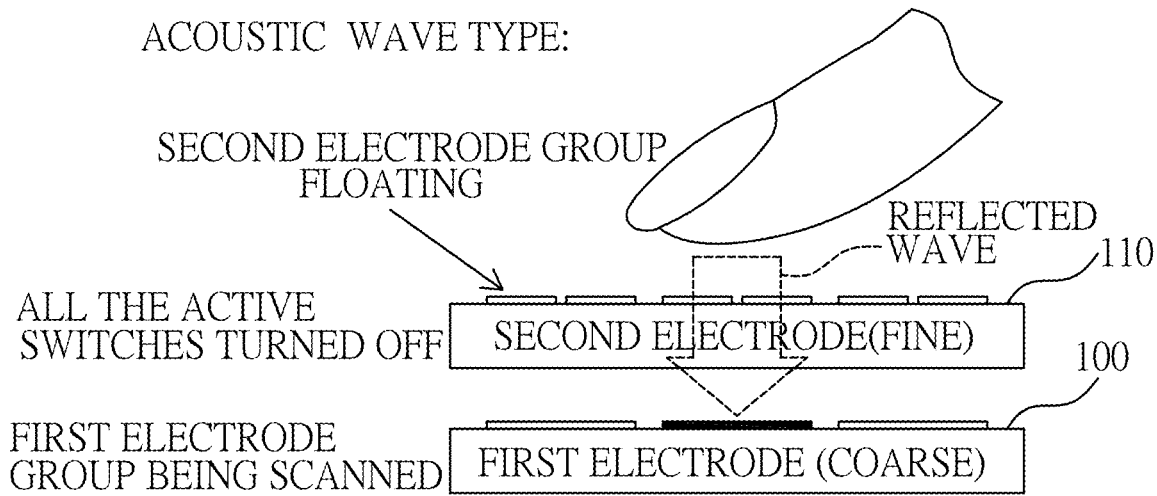
Figure 6D:
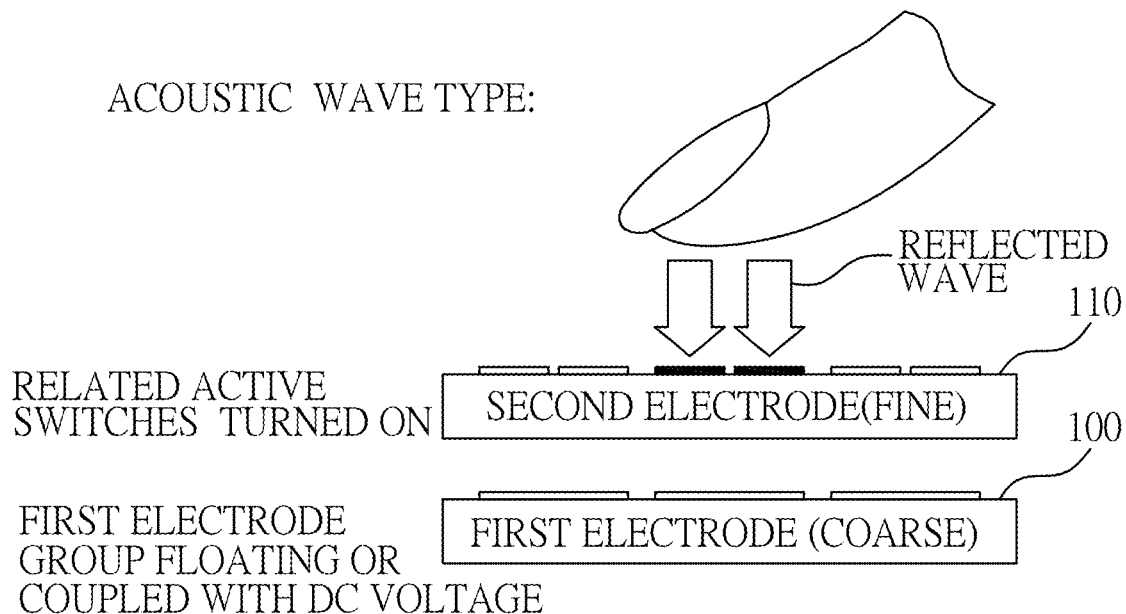
Figure 6E:
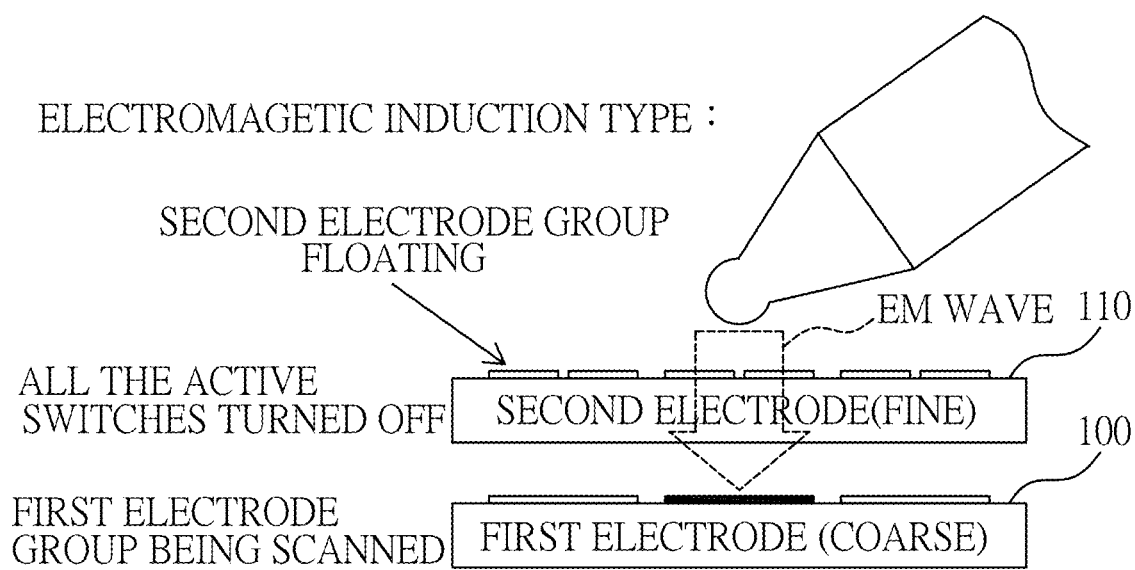
Figure 6F:
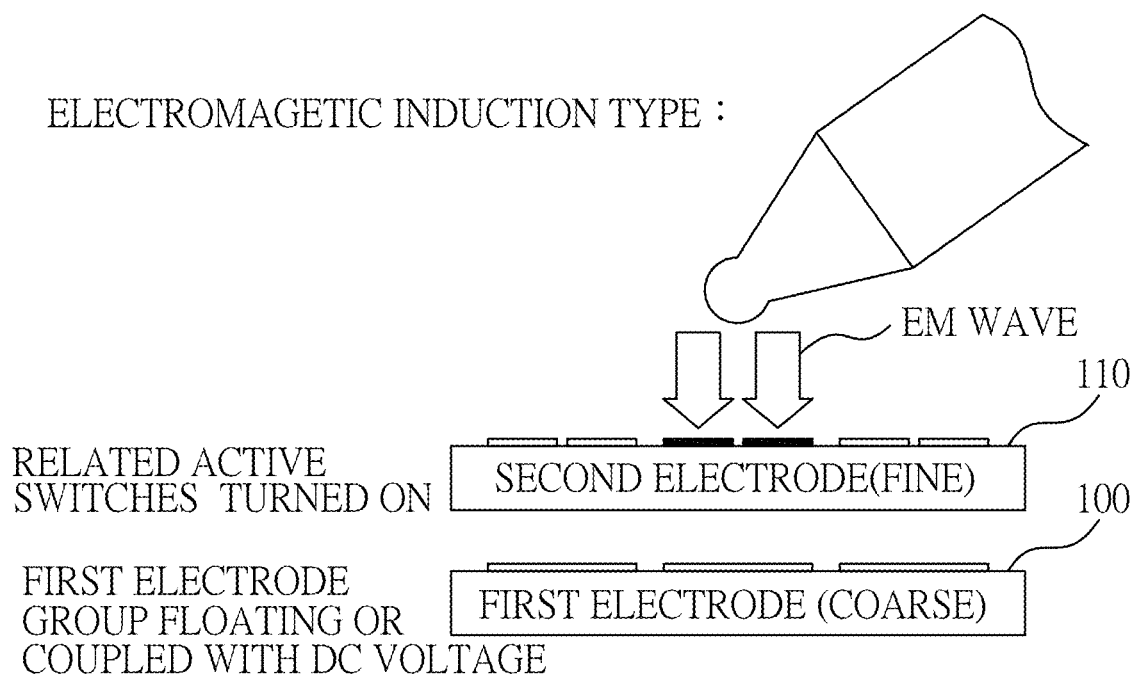
Figure 6G:
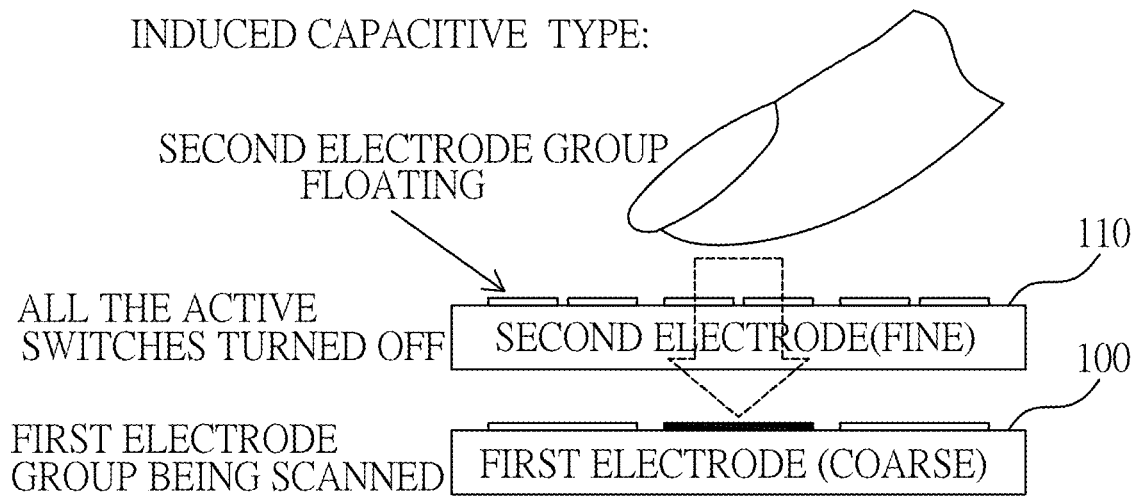
Figure 6H:
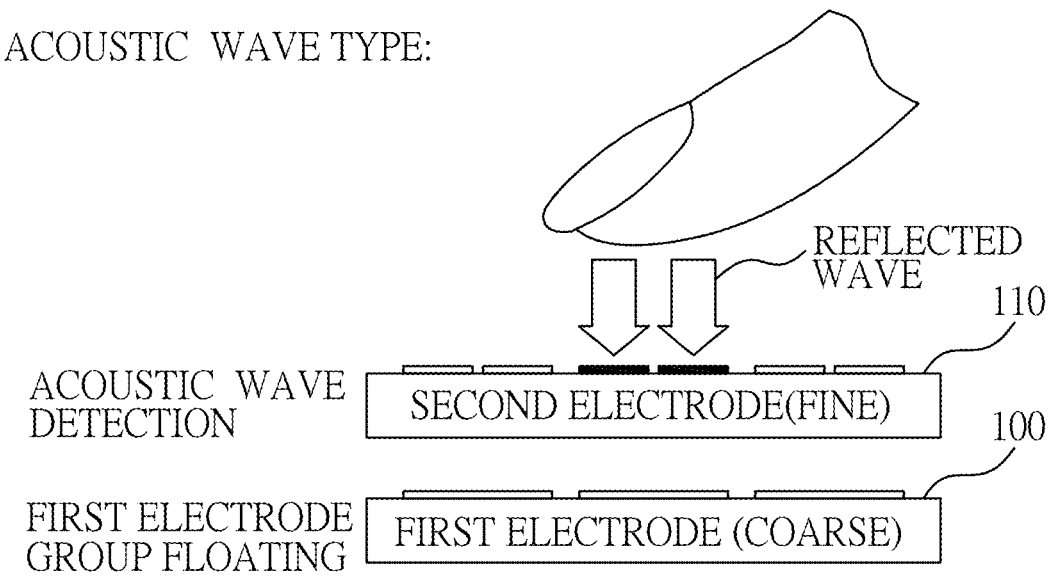
Figure 6I:
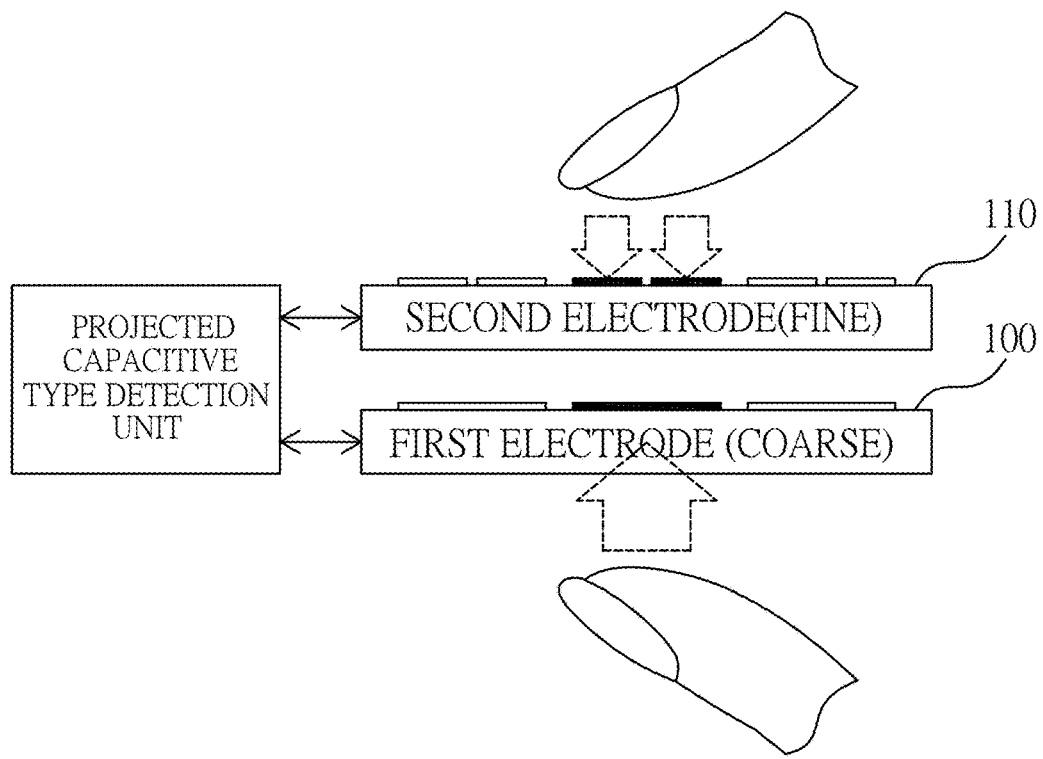
Figure 6J:
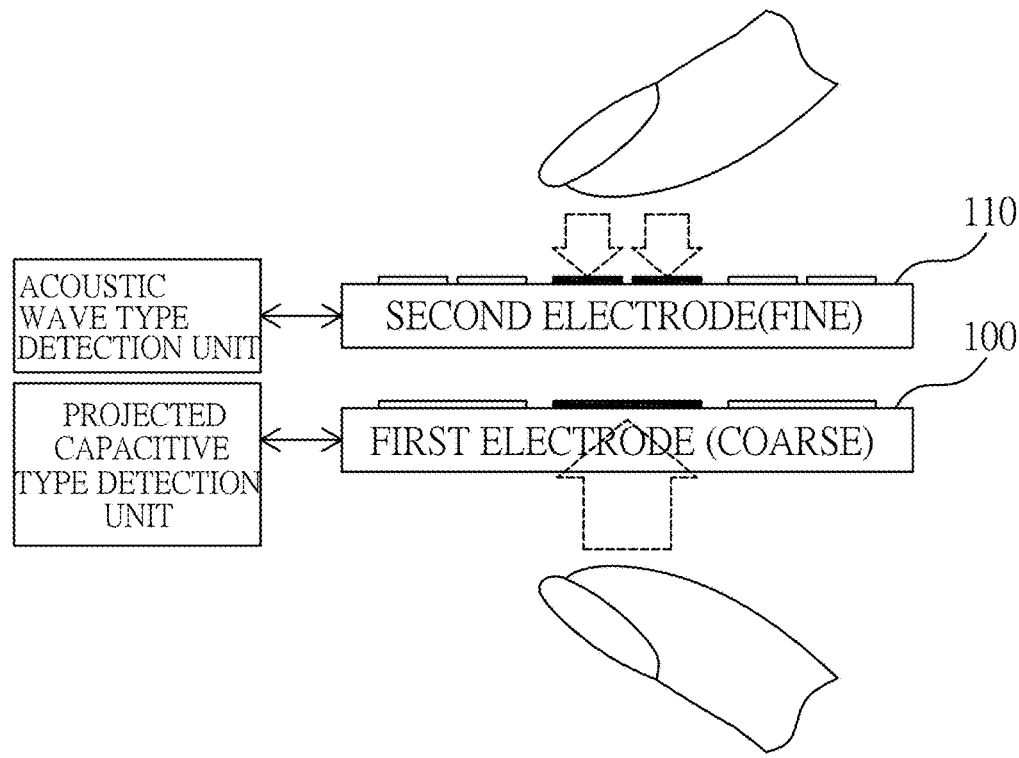

Please refer to FIG. 3, which illustrates a block diagram of an intelligent touch sensing device according to an embodiment of the present invention. As illustrated in FIG. 3, the intelligent touch sensing device includes a first electrode group 100, a second electrode group 110, and a touch detection unit 120.

The first electrode group 100 has a first plurality (n) of first electrodes coupled to the touch detection unit 120 via conductive lines T1(1)-T1(n), n being a positive integer.

The second electrode group 110 has a second plurality (m) of second electrodes, each of the second electrodes being under a control of at least one active switch to couple with a touch detection signal transmitted via conductive lines T2(1)-T2(X), X being a positive integer. The active switches are driven by control signals C(1)-C(Y), Y being a positive integer, and the second plurality (m=X*Y) being larger than the first plurality (n). Please refer to FIG. 4a-4f, which illustrates 6 embodiments of the first electrode group and the second electrode group. As illustrated in FIG. 4a-4f, each of the second electrodes of the second electrode group 110 is addressable under the control of at least one active switch.

The touch detection unit 120, coupled with the first electrode group 100 and the second electrode group 110, is used for operating according to an application program to optionally perform a first touch detection procedure on the first electrode group 100, perform a second touch detection procedure on the second electrode group 110, or perform the first detection procedure on the first electrode group 100 and then perform the second touch detection procedure on at least one region of the second electrode group 110, wherein the at least one region is determined according to a detection result of the first touch detection procedure so as to greatly reduce the workload of the touch detection unit 120.

The first electrode group 100 and the second electrode group 110 can be on a same plane or on different planes. Please refer to 5a-5b, which illustrates respectively a scenario that the first electrode group 100 and the second electrode group 110 are on different planes and a scenario that the first electrode group 100 and the second electrode group 110 are on a same plane. Besides, the first electrode and the second electrode can be of a rectangular shape or a comb shape.

The first touch detection procedure can be a first acoustic wave type touch detection procedure or a first capacitive type touch detection procedure or a first electromagnetic induction type touch detection procedure, and the second touch detection procedure can be a second acoustic wave type touch detection procedure or a second capacitive type touch detection procedure or a second electromagnetic induction type touch detection procedure. Please refer to FIG. 6a-6j, which illustrates scenarios that the first electrode group 100 and the second electrode group 110 use capacitive type touch detection procedure or electromagnetic induction type touch detection procedure or acoustic wave type touch detection procedure for touch detection, the capacitive type touch detection procedure can be an induced capacitive type touch detection procedure or a projected capacitive type touch detection procedure. As illustrated in FIG. 6a-6j, the present invention can provide single-side touch operation or double-sides touch operation, and the first electrode group 100 and the second electrode group 110 can have a same touch detection scheme or different touch detection schemes.

The touch detection unit 120 outputs data $D_{OUT}$, which can include first touch sensed data of the first electrode group 100 and/or second touch sensed data of the second electrode group 110, and/or fusion data of the first touch sensed data and the second touch sensed data.

The fusion data can be formed with the first touch sensed data having a first bit number per data for representing a first grayscale resolution and the second touch sensed data having a second bit number per data for representing a second grayscale resolution, wherein the first bit number is larger than the second bit number, so that the fusion data can provide enough sensed touch information with a minimum total bit number. As the first touch sensed data are derived from the first electrode group 100, the second touch sensed data are derived from the second electrode group 110, the quantity of the first touch sensed data is smaller than the quantity of the second touch sensed data, and by making the second bit number per data smaller than the first bit number per data, the total bit number for representing the fusion data can be greatly reduced. For example, if the first electrode group 100 has 20 said first electrodes and the first touch sensed data have 8 bits per data representing 256 gray scales, and the second electrode group 110 has 1000 said second electrodes and the second touch sensed data have 1 bit per data representing 2 gray scales, then the total bit number of all the first touch sensed data and all the second touch sensed data will be equal to 8×20+1×1000=1160, and the fusion data derived by performing a fusion operation on the first touch sensed data and the second touch sensed data can provide an effect of a high resolution or large gray levels substantially equivalent to the effect of 1000 8-bit data. On the other hand, although directly using 8-bit (256 gray levels) per data to represent the second touch sensed data can provide more detailed touch sensed information, however, the total bit count thereof will be 8×1000=8000, much larger than the total bit count (1160) required of the present invention.

The first touch sensed data and the second touch sensed data can both be touch coordinate data, or the first touch sensed data be touch coordinate data and the second touch sensed data be raw data of sensed values that are generated without going through a touch coordinate determining procedure (the raw data of sensed values can be digital data derived from a conversion operation on an analog sensed value of a touch sensing point, and a signal processing operation including a filtering operation and/or a gain adjustment operation can be included or not included in the conversion operation), or both the first touch sensed data and the second touch sensed data are raw data of sensed values that are generated without going through a touch coordinate determining procedure, or both the first touch sensed data and the second touch sensed data are processed data of the raw data of sensed values.

The application program can be a fingerprint detection program, and the touch detection unit 120 generates fingerprint data after executing the fingerprint detection program, wherein, the fingerprint data can be raw data derived after the touch detection unit 120 executes the first touch detection procedure and the second touch detection procedure, the raw data being not coordinate data generated by a touch coordinate determining procedure; or the fingerprint data be processed data derived after the touch detection unit 120 executes the first touch detection procedure, the second touch detection procedure, and a fingerprint characteristics retrieving procedure.

The application program can also be a pressure detection program, which is capable of generating pressure value data and/or pressure vector data according to a size of touched area or a total sensed value calculated from raw data of sensed values derived after performing the first touch detection procedure and the second touch detection procedure, the raw data being generated without going through a touch coordinate determining procedure.

The touch detection unit 120 can generate pressure value data and/or coordinate data according to a detection result of the first touch detection procedure, and generate fingerprint data and/or fingerprint characteristics data according to a detection result of the second touch detection procedure; or generate coordinate data according to a detection result of the first touch detection procedure, and generate fingerprint characteristics data and/or pressure value data according to a detection result of the second touch detection procedure.

Figure 7:
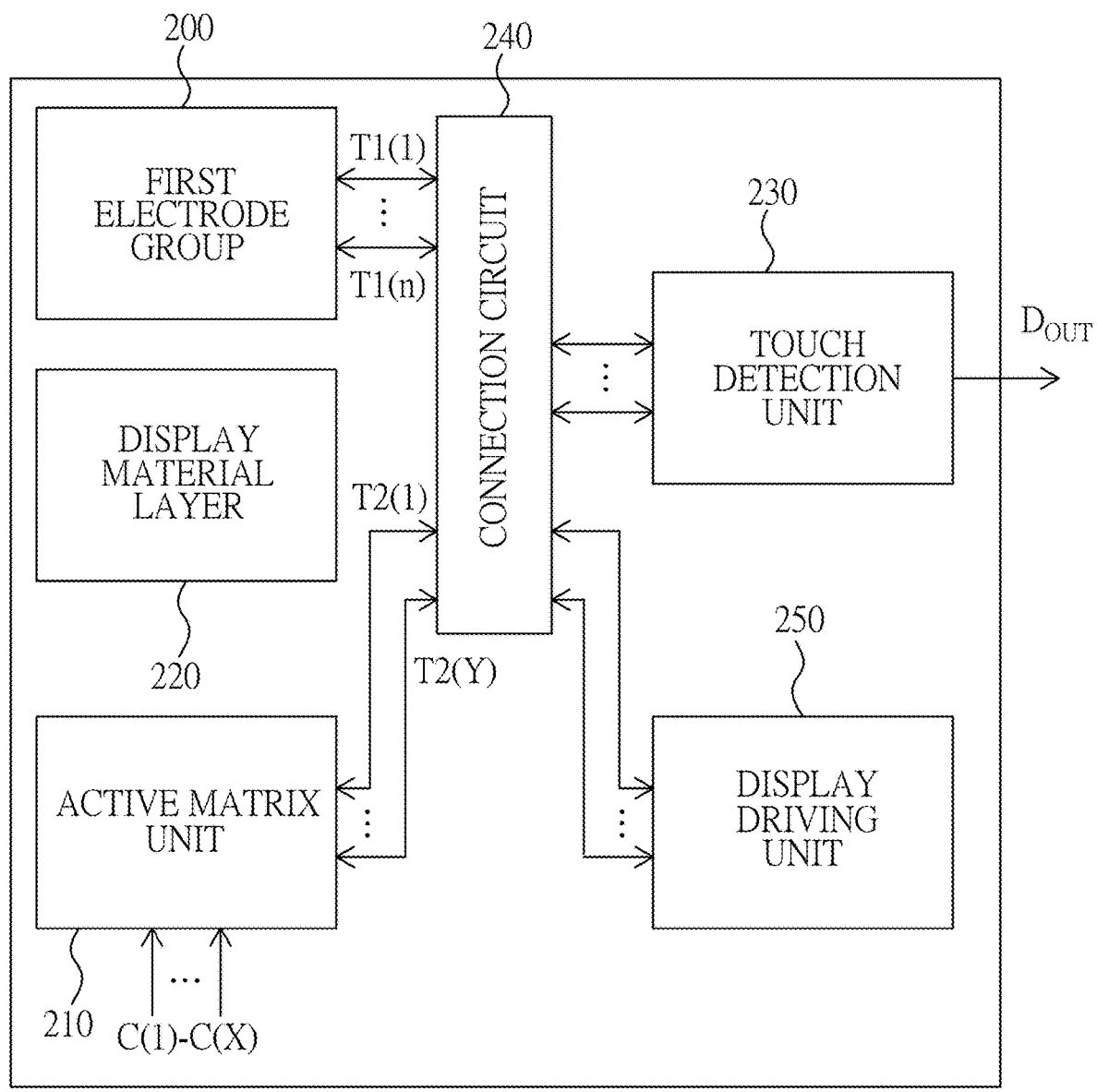
FIG. 7 illustrates a block diagram of an intelligent touch sensing device according to another embodiment of the present invention.

Please refer to FIG. 7, which illustrates a block diagram of an intelligent touch sensing device according to another embodiment of the present invention. As illustrated in FIG. 7, the intelligent touch sensing device includes a first electrode group 200, an active matrix unit 210, a display material layer 220, a touch detection unit 230, a connection circuit 240, and a display driving unit 250.

The first electrode group 200 has a first plurality of first electrodes coupled to the touch detection unit 230 or the display driving unit 250 via conductive lines T1(1)-T1(n) and the connection circuit 240, n being a positive integer.

The active matrix unit 210 has a second plurality (m) of second electrodes and each of the second electrodes is addressable by at least one switch and is coupled to the touch detection unit 230 to serve as a touch sensing electrode or coupled to the display driving unit 250 to serve as a display electrode via conductive lines T2(1)-T2(X) and the connection circuit 240, where X is a positive integer, and the active switches are driven by control signals C(1)-C(Y), Y being a positive integer, and the second plurality (m=X*Y) being larger than the first plurality (n).

Figure 8A:
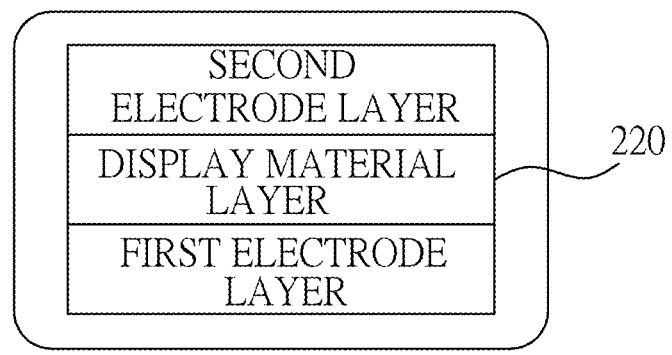
FIG. 8a-8c illustrates scenarios that the display material layer of the intelligent touch sensing device of FIG. 7 is located between, above, or below the first electrode and the second electrode.
Figure 8B:
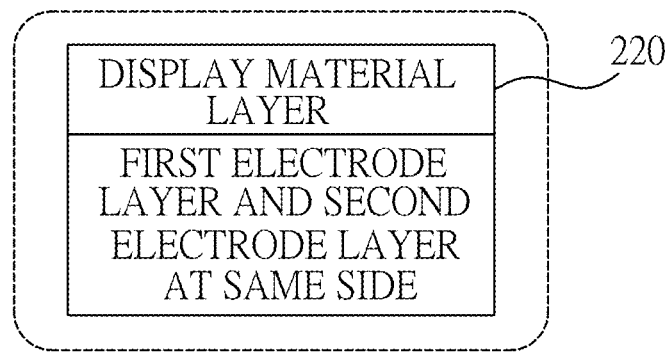
Figure 8C:
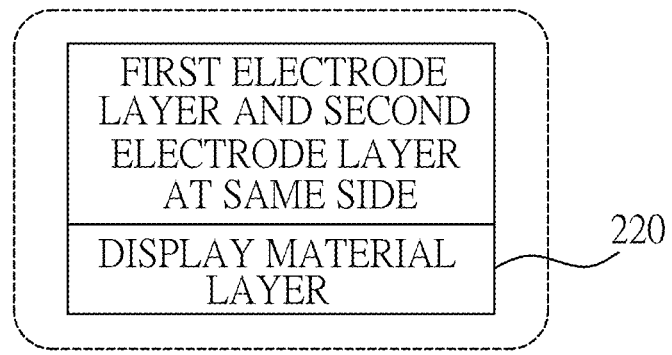

The display material layer 220 is corresponding with a plurality of pixel units and is used to be driven by the active matrix unit 210 with voltage signals or current signals to provide a display image during a display procedure. For different applications, as shown in FIG. 8a-8c, the first electrodes and the second electrodes can be located at two different sides or a same side of the display material layer 220. Besides, the first electrode and the second electrode can be of a rectangular shape or a comb shape.

The touch detection unit 230 is coupled with the first electrode group 200 and with the active matrix unit 210 via the connection circuit 240 for performing a first touch detection procedure on the first electrode group 200 or performing a second touch detection procedure on the active matrix unit 210 or performing the first detection procedure on the first electrode group 200 and then the second touch detection procedure on at least one region of the active matrix unit 210 as optionally required by an application program, wherein the at least one region is determined according to a detection result of the first touch detection procedure so as to greatly reduce the workload of the touch detection unit 230.

The first electrode group 200 and the active matrix unit 210 can be on a same plane or on different planes.

The touch detection unit 230 can perform the first touch detection procedure on a plurality of the first electrodes corresponding to a plurality of the pixel units not yet driven during the display procedure, the pixel units being set to be sequentially driven during the display procedure. That is, the first touch detection procedure can be embedding into the display procedure. Besides, the touch detection unit 230 can also interleave the first touch detection procedure and/or the second touch detection procedure with the display procedure in the time domain.

The connection circuit 240 can be a multiplexing circuit or a bus circuit to couple the first electrode group 200 and the active matrix unit 210 to the touch detection unit 230 or to the display driving unit 250, so as to provide a touch detection function and a display function. Besides, the touch detection unit 230 and the display driving unit 250 can be integrated into a chip, or the touch detection unit 230, the display driving unit 250, and the connection circuit 240 can be integrated into a chip.

The touch detection unit 230 outputs data $D_{OUT}$, which can include first touch sensed data of the first electrode group 200 and/or second touch sensed data of the active matrix unit 210, wherein both the first touch sensed data and the second touch sensed data can be touch coordinate data, or the first touch sensed data be touch coordinate data and the second touch sensed data be raw data of sensed values that are generated without going through a touch coordinate determining procedure, or both the first touch sensed data and the second touch sensed data be raw data of sensed values that are generated without going through a touch coordinate determining procedure.

The application program can be a fingerprint detection program, and the touch detection unit 230 generates fingerprint data after executing the fingerprint detection program, wherein the fingerprint data can be raw data of sensed values derived after the touch detection unit 230 executes the first touch detection procedure and the second touch detection procedure, the raw data being not coordinate data generated by a touch coordinate determining procedure; or the fingerprint data can be processed data derived after the touch detection unit 230 executes the first touch detection procedure, the second touch detection procedure, and a fingerprint characteristics retrieving procedure.

The application program can also be a pressure detection program, which is capable of generating pressure value data and/or pressure vector data according to a size of touched area or a total sensed value calculated from raw data of sensed values derived after performing the first touch detection procedure and the second touch detection procedure, the raw data being generated without going through a touch coordinate determining procedure.

The touch detection unit 230 can generate pressure value data and/or coordinate data according to a detection result of the first touch detection procedure, and generate fingerprint data and/or fingerprint characteristics data according to a detection result of the second touch detection procedure; or generate coordinate data according to a detection result of the first touch detection procedure, and generate fingerprint characteristics data and/or pressure value data according to a detection result of the second touch detection procedure.

The first touch detection procedure can be a first acoustic wave type touch detection procedure or a first capacitive type touch detection procedure, and the second touch detection procedure can be a second acoustic wave type touch detection procedure or a second capacitive type touch detection procedure. Besides, the present invention can provide single-side touch operation or double-side touch operation, and the first electrode group 200 and the active matrix unit 210 can have a same touch detection mode or different touch detection modes.

Besides, the first electrode group 200 and the active matrix unit 210 can be used for detecting a touch operation on a single touch zone of the intelligent touch sensing device, or for detecting two touch operations separately on a first touch zone and a second touch zone of the intelligent touch sensing device, and the first touch zone and the second touch zone can be on a same plane or on different planes.

Besides, the touch detection unit 230 can perform a data fusion procedure on first touch sensed data derived from the first electrode group 200 and on second touch sensed data derived from the active matrix unit 210 to generate data of a fusion image, wherein both the first touch sensed data and the second touch sensed data are raw data of sensed values generated without going through a touch coordinate determining procedure.

Figure 9A:
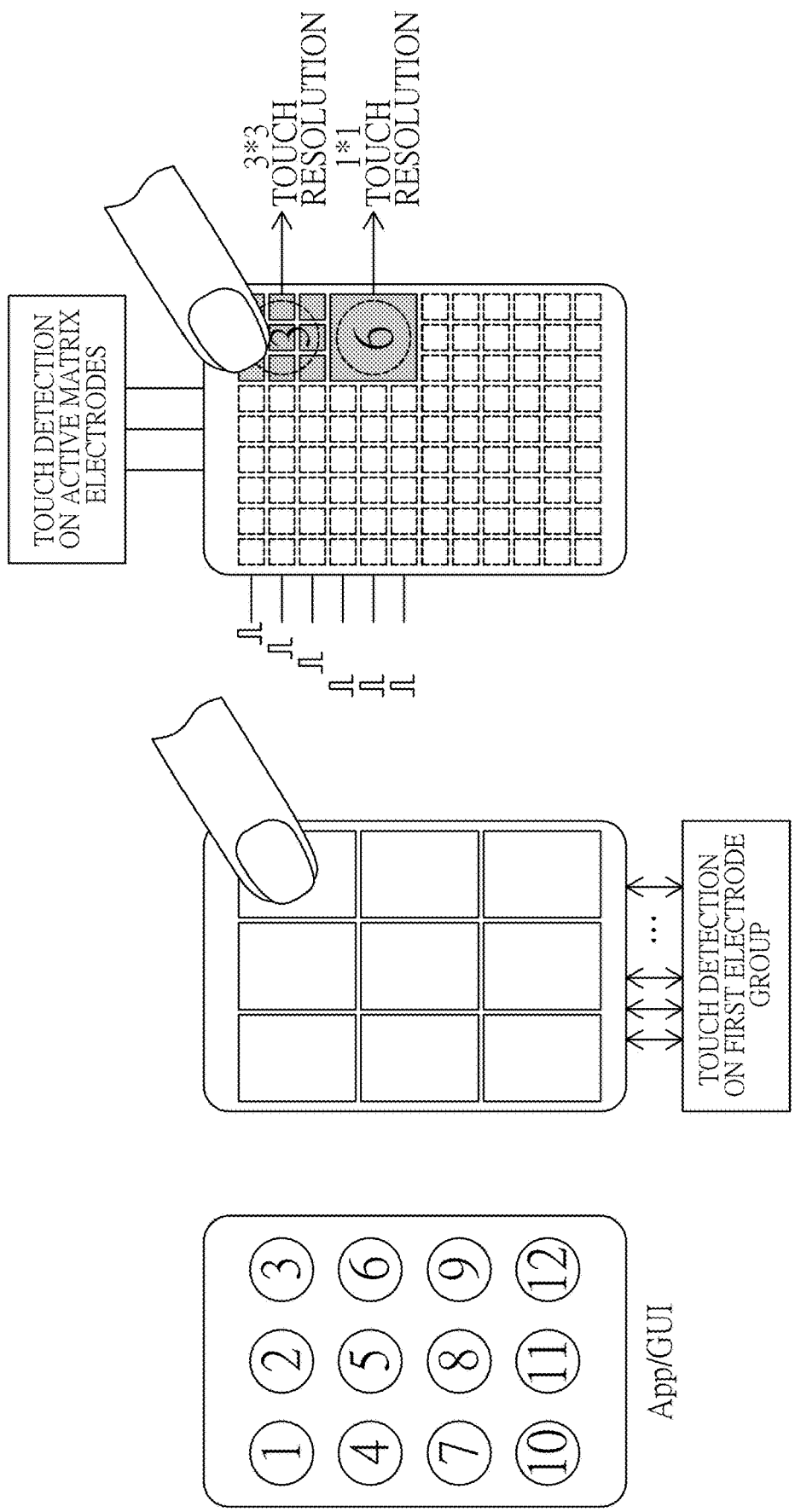
FIG. 9a-9f illustrates 6 applications of the intelligent touch sensing device of the present invention.
Figure 9B:
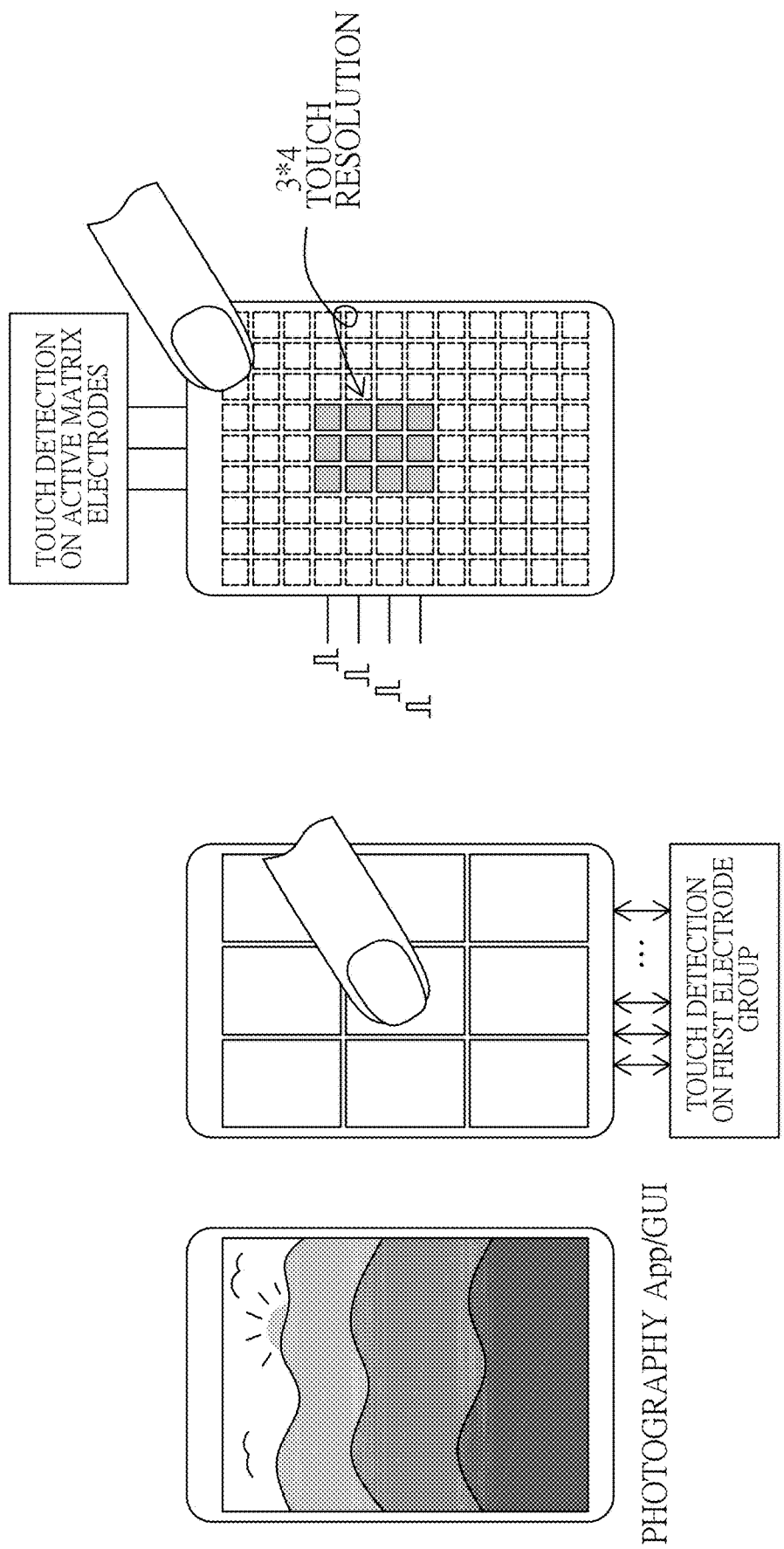
Figure 9C:
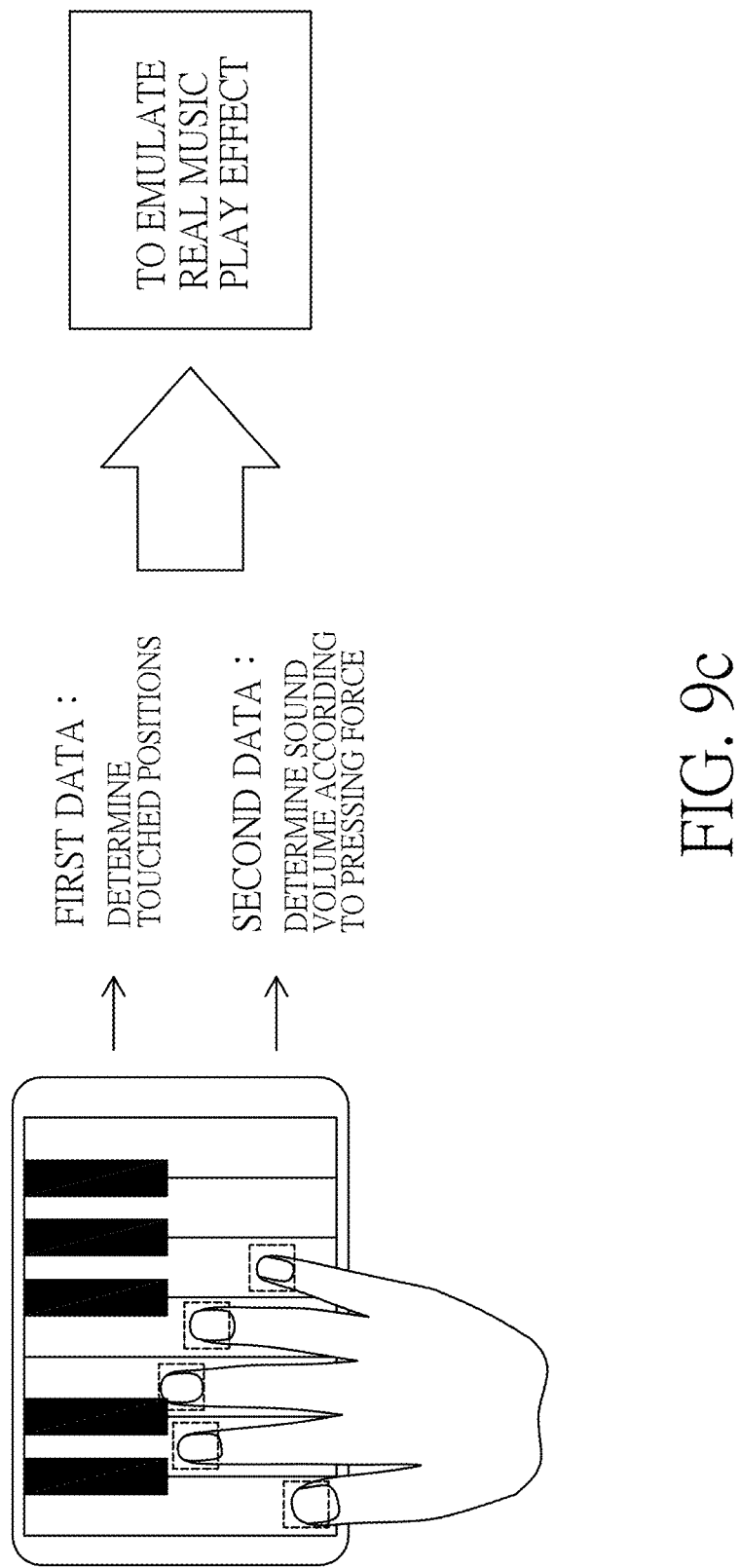
Figure 9D:
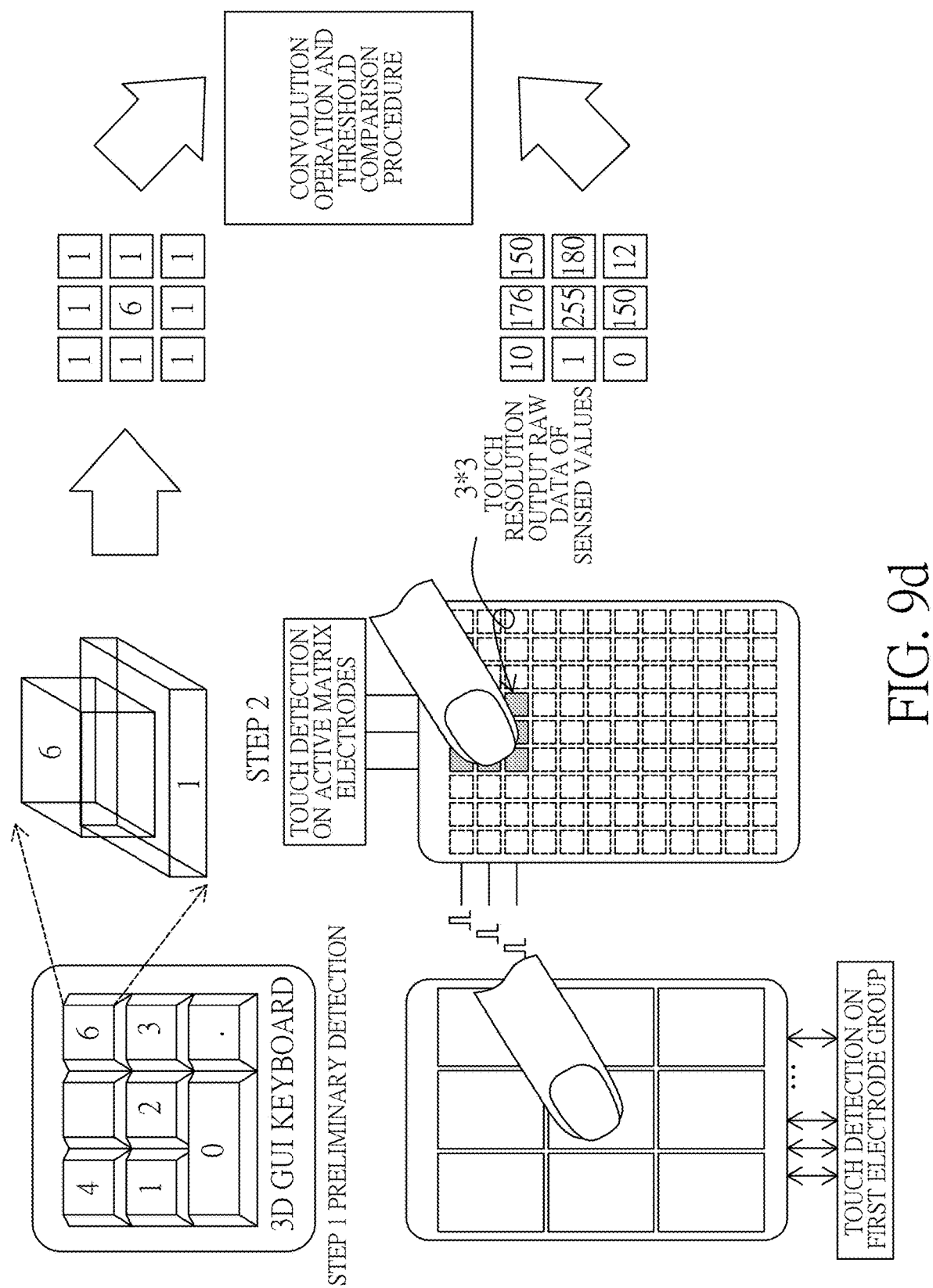
Figure 9E:
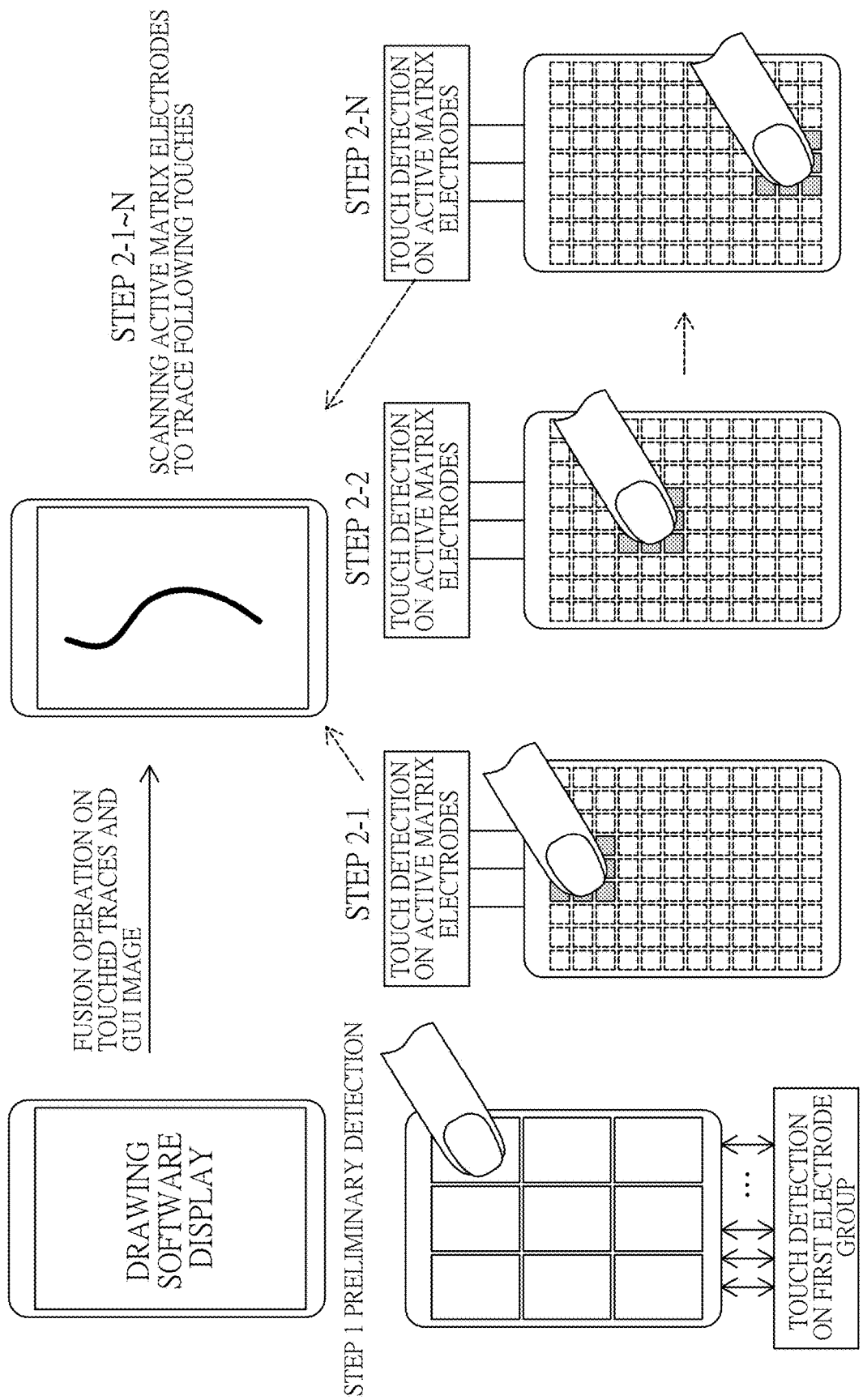
Figure 9F:
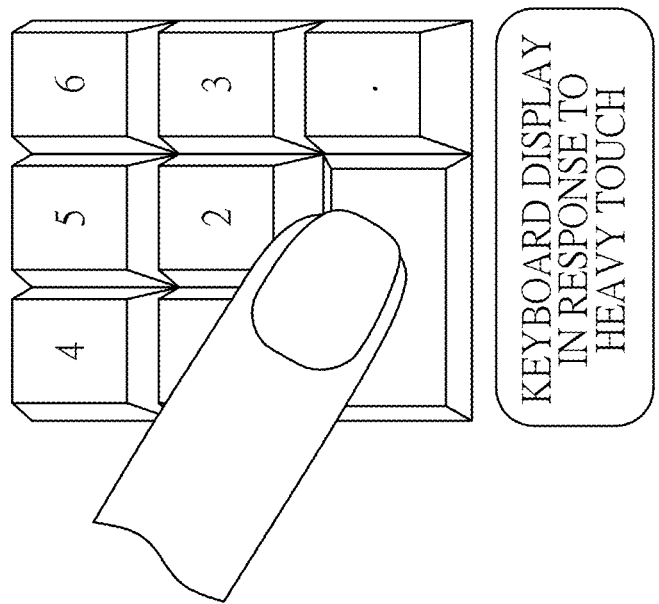
Figure 9F:
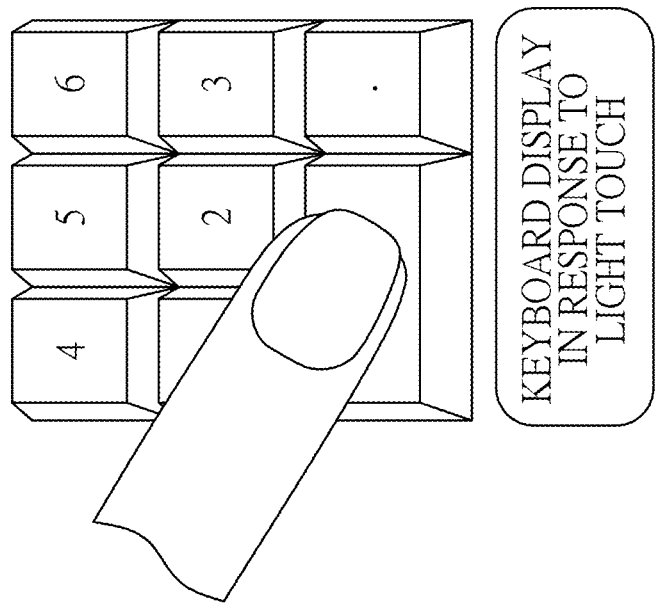

Please refer to FIG. 9a-9f, which illustrates 6 applications of the intelligent touch sensing device of the present invention, wherein, FIG. 9a illustrates a scenario that the intelligent touch device of the present invention sets a touch resolution and shapes of effective sensing units (formed by a plurality of the second electrodes) by driving the gate of switches and the connection circuit in accordance with a requirement of an APP (application program) or GUI (graphic user interface); FIG. 9b illustrates a scenario that the intelligent touch device of the present invention provides a focus adjusting function or a shutter button function according to different pressing forces; FIG. 9c illustrates a scenario that the intelligent touch device of the present invention provides a music play effect of different volumes of sound in response to different pressing forces; FIG. 9d illustrates a scenario that the intelligent touch device of the present invention provides a 3D touch function by using 3D GUI weightings to mask the raw data of sensed values to perform a convolution operation; FIG. 9e illustrates a scenario that the intelligent touch device of the present invention provides a touch drawing function by performing a fusion operation on detected touch traces and a GUI object image, wherein the intelligent touch device detects touches on the first electrode group first, and then detects following touches on the active matrix unit; and FIG. 9f illustrates a scenario that the intelligent touch device of the present invention provides different displays for a GUI object and executing different corresponding procedures in response to different pressing forces.

In addition, the intelligent touch device of the present invention can be applied to a curved touch sensing device or a flexible or foldable touch sensing device by utilizing organic transistors and a flexible substrate.

Figure 10:
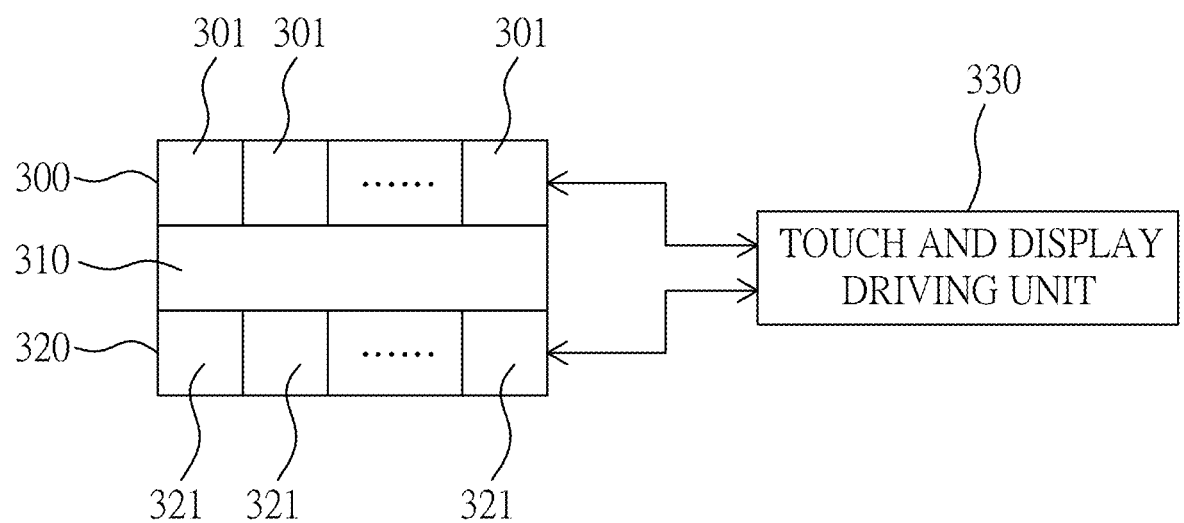
FIG. 10 is an illustrative view of an intelligent sensing touch display device according to an embodiment of the present invention.

Please refer to FIG. 10, which is an illustrative view of an intelligent sensing touch display device according to an embodiment of the present invention. As illustrated in FIG. 10, the intelligent sensing touch display device includes a first electrode group 300 (corresponding to a common voltage layer of a conventional display device), an interface layer 310, an active array unit 320, and a touch and display driving unit 330, where the interface layer 310, which is a display material layer or a display and touch sensing material layer, is interposed between the first electrode group 300 and the active array unit 320 for being driven by the active array unit 320 in a display procedure to provide a display image. According to the present invention, the touch and display driving unit 330 is coupled with the first electrode group 300 and the active array unit 320 for responsive to an application program to selectively perform a first touch detection procedure on the first electrode group 300, or performing a second touch detection procedure on the active array unit 320, or performing the first touch detection procedure on the first electrode group 300, and then performing the second touch detection procedure on at least one area of the active array unit 320, where the at least one area is determined according to a detection result of the first touch detection procedure.

Figure 11A:
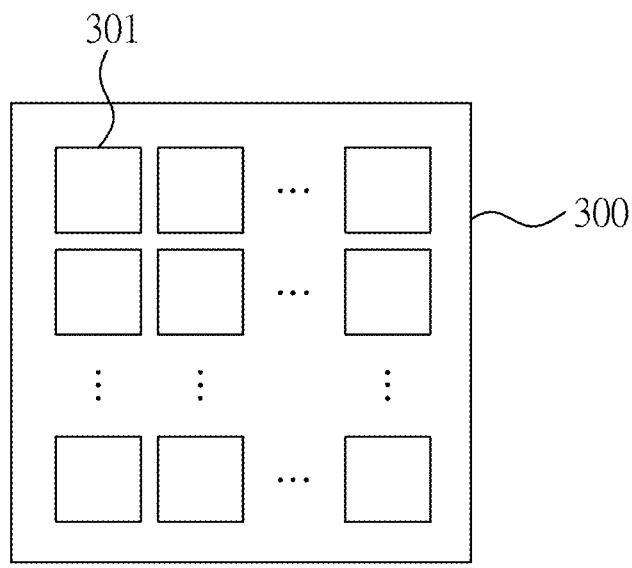
FIG. 11a illustrates a distribution of first electrodes of the first electrode group of the intelligent sensing touch display device of FIG. 10.
Figure 11B:
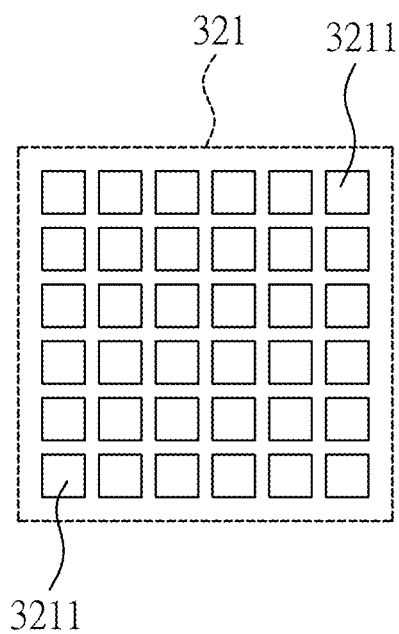
FIG. 11b illustrates an embodiment of a second electrode unit of the intelligent sensing touch display device of FIG. 10.

Please refer to FIG. 11a, which illustrates a distribution of first electrodes 301 of the first electrode group 300, where each first electrode 301 is vertically aligned with a second electrode unit 321 of the active array unit 320; and FIG. 11b, which illustrates an embodiment of the second electrode unit 321.

As is illustrated in FIG. 11a, the first electrode group 300 has N first electrodes 301 on a first plane, N being a positive integer.

As is illustrated in FIG. 11b, each second electrode unit 321 has M second electrodes 3211, each of the M second electrodes 3211 being controlled by at least one active switch and opposite to a first electrode 301, M being a positive integer greater than 1. When the interface layer 310 is the display material layer, each of the second electrodes 3211 is used as a display electrode or a touch sensing electrode, and when the interface layer 310 is the display and sensing material layer, a part of the second electrodes 3211 are used as the display electrodes or the touch sensing electrodes, and another part of the second electrodes 3211 are used as the touch sensing electrodes, the touch sensing electrode being a capacitive electrode, a photosensitive electrode, or a thermal sensing electrode.

Figure 11C:
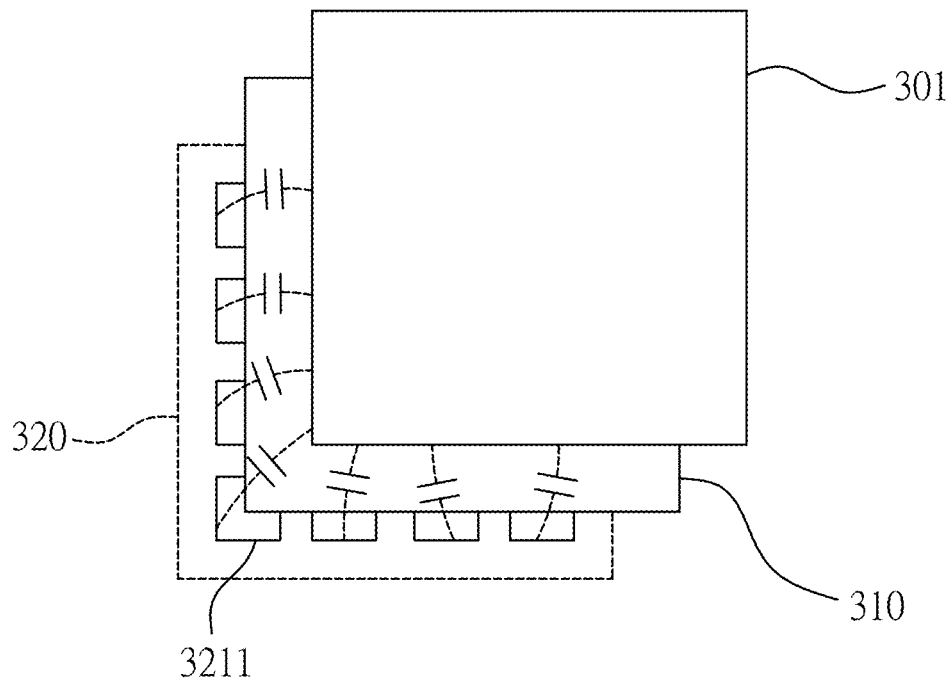
FIG. 11c is an illustrative diagram for an AC channel touch sensing unit formed with the first electrodes and the second electrodes.
Figure 11D:
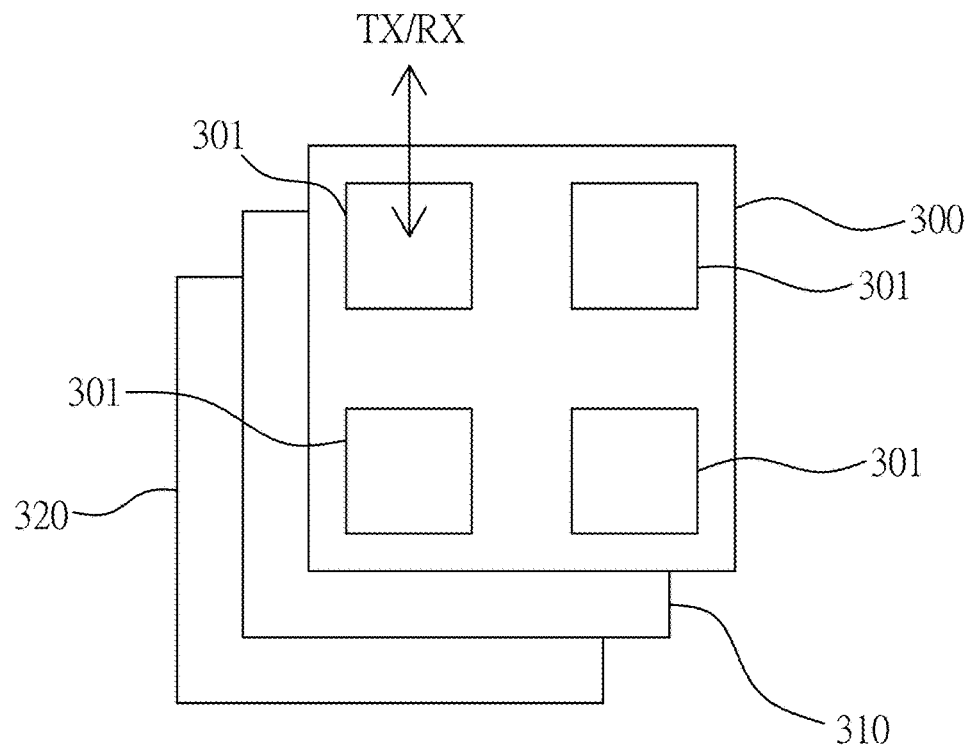
FIG. 11d illustrates a scenario that a touch and display driving unit drives one AC path touch sensing unit in a self-capacitance mode.
Figure 11E:
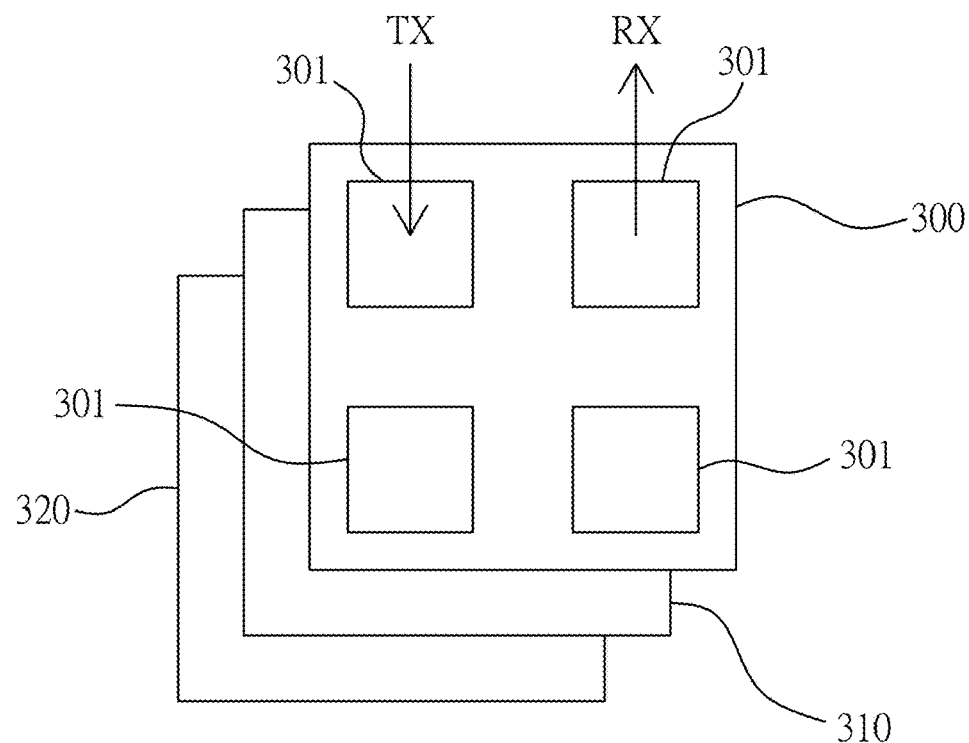
FIG. 11e illustrates a scenario that a touch and display driving unit drives two adjacent AC path touch sensing units in a mutual-capacitance mode.
Figure 11F:
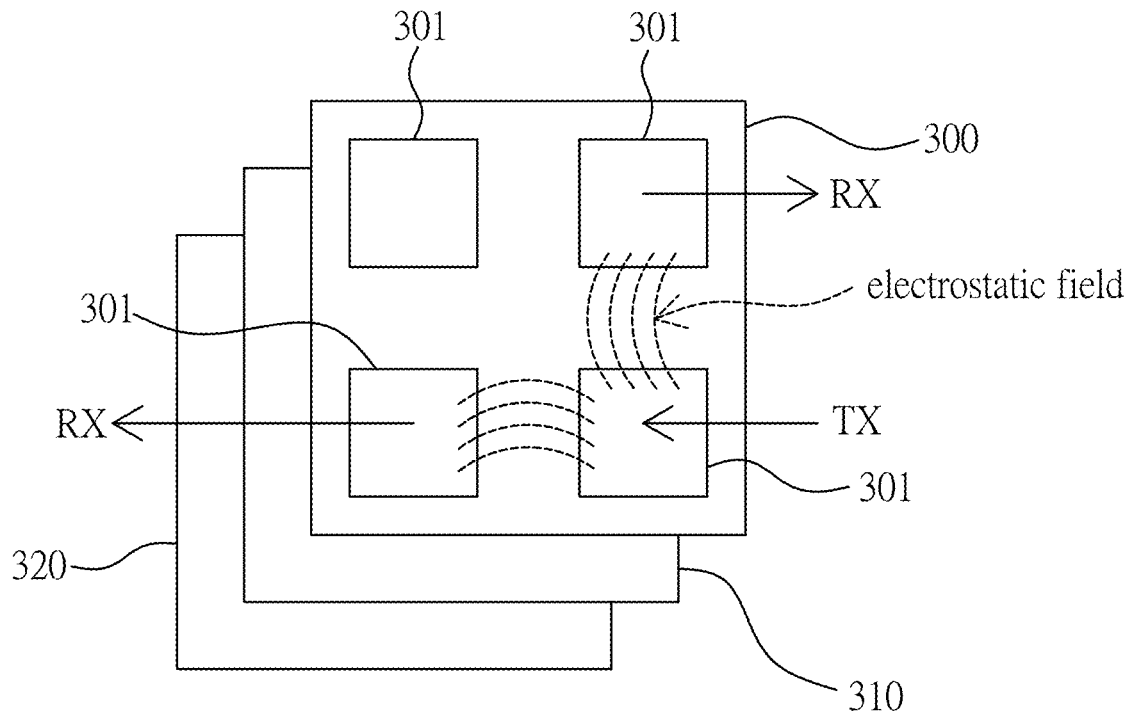
FIG. 11f illustrates a scenario that a touch and display driving unit drives at least two adjacent AC path touch sensing units in an electrostatic field sensing mode.

When in operation, a first electrode 301 and M second electrodes 3211 form an AC channel touch sensing unit, so that the touch and display driving unit 330 will recognize that the AC path touch sensing unit is touched when any electrode in the AC channel touch sensing unit is touched by a finger. Please refer to FIG. 11c, which is an illustrative diagram for an AC channel touch sensing unit formed with a first electrode 301 and M second electrodes 3211. As illustrated in FIG. 11c, there are parasite capacitors existing between first electrode 301 and M second electrodes 3211, so the electrodes thereof will be connected electrically one another when a touch detection signal, which is an AC (alternating current) signal, is applied to the AC channel touch sensing unit. For possible embodiments, the touch and display driving unit 330 can drive one AC path touch sensing unit in a self-capacitance mode, as illustrated in FIG. 11d, or drive two adjacent AC path touch sensing units in a mutual-capacitance mode, as illustrated in FIG. 11e, or drive at least two adjacent AC path touch sensing units in an electrostatic field sensing mode, as illustrated in FIG. 11f.

Figure 12:
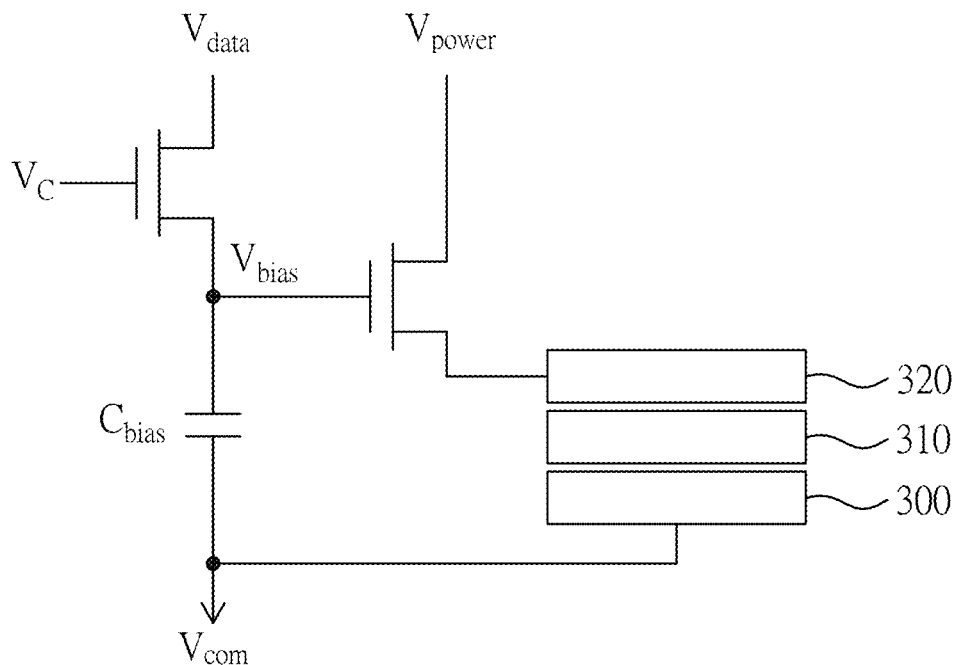
FIG. 12 illustrates a driving circuit for an active mode OLED.

Besides, the interface layer 310 can be an OLED (organic light emitting diode) material layer or a QDLED (quantum dot light emitting diode) material layer. Please refer to FIG. 12, which illustrates a driving circuit for an active mode OLED. As illustrated in FIG. 12, two transistors are used for controlling a driving current for an OLED to determine a brightness level of a corresponding pixel.

Figure 13A:
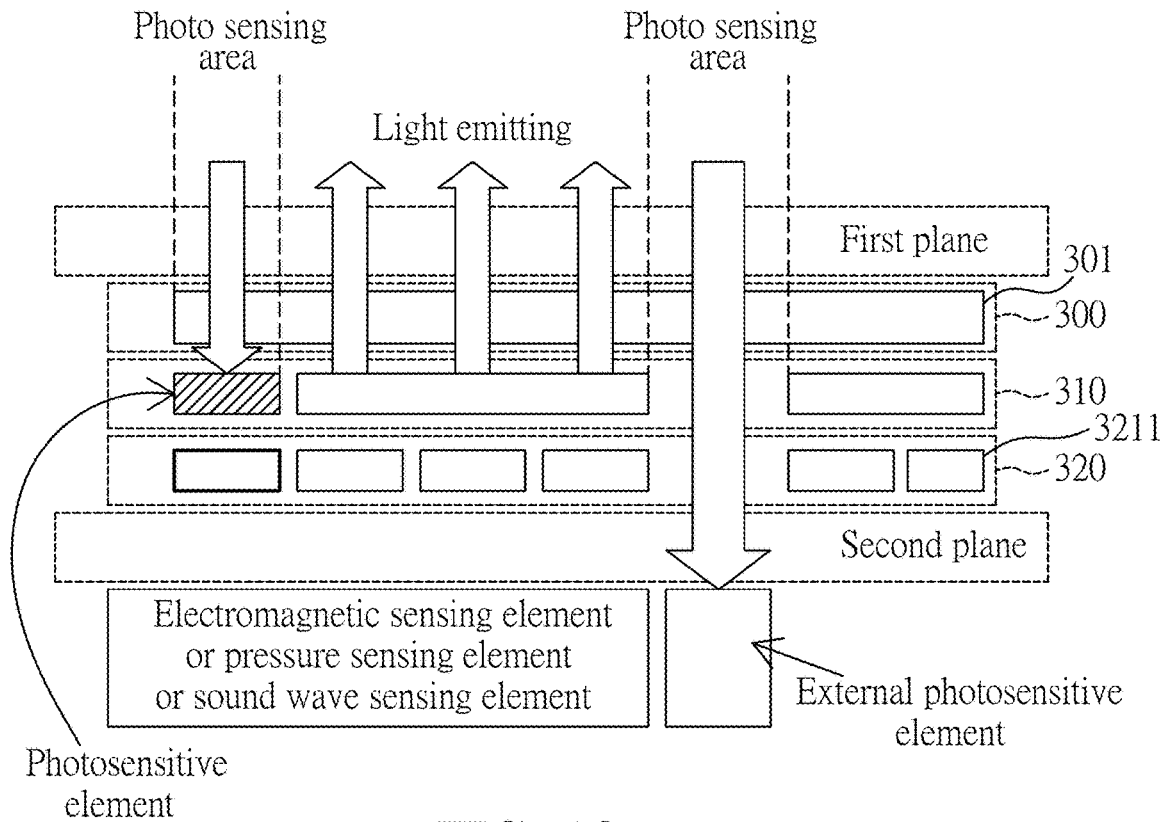
FIG. 13a is an illustrative diagram of a top emission type intelligent sensing touch display device having a photosensitive element integrated into a display layer, and an external photosensitive element and an electromagnetic sensing element (or a pressure sensing element or a sound wave sensing element) attached with the bottom side of the intelligent sensing touch display device.
Figure 13B:
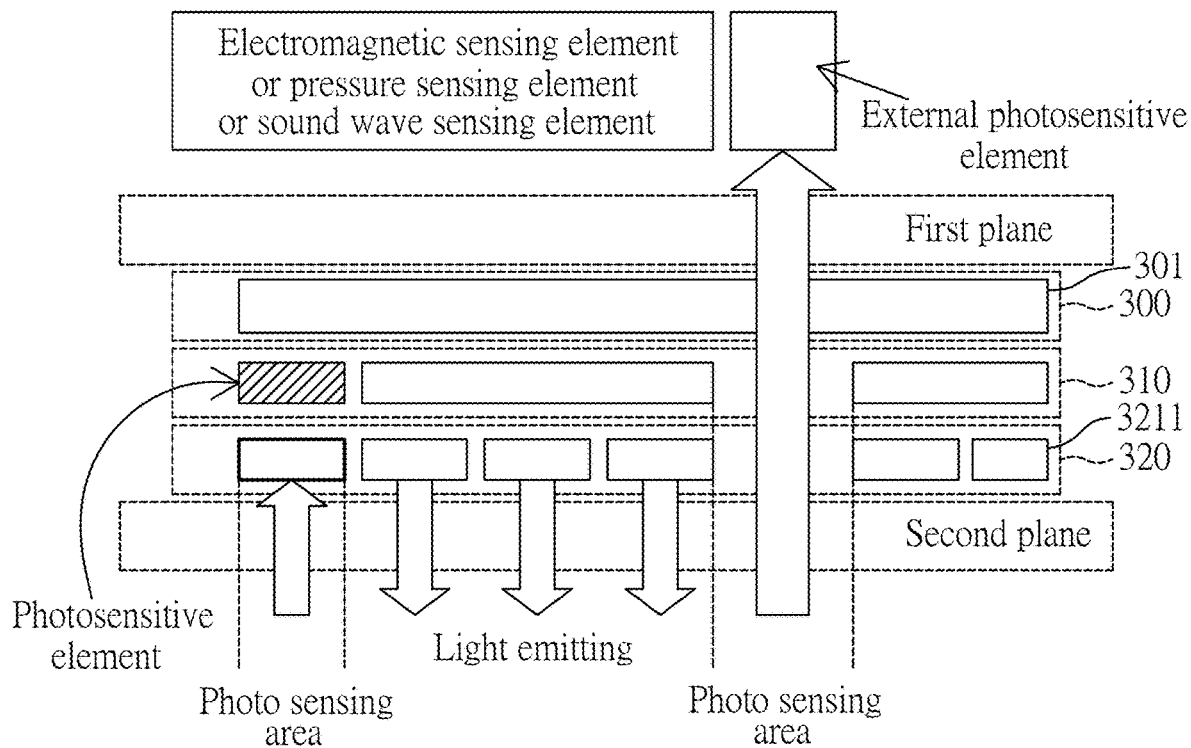
FIG. 13b is an illustrative diagram of a bottom emission type intelligent sensing touch display device having a photosensitive element integrated into a display layer, and an external photosensitive element and an electromagnetic sensing element (or a pressure sensing element or a sound wave sensing element) attached with the top side of the intelligent sensing touch display device.

Besides, based on the structure of the intelligent sensing touch display device mentioned above, one or more sensing elements of the group consisting of photosensitive element, electromagnetic sensing element, pressure sensing element and sound wave sensing element can be integrated into or with the intelligent sensing touch display device. Please refer to FIG. 13a, which is an illustrative diagram of a top emission type intelligent sensing touch display device having a photosensitive element integrated into a display layer, and an external photosensitive element and an electromagnetic sensing element (or a pressure sensing element or a sound wave sensing element) attached with the bottom side of the intelligent sensing touch display device, where both the photosensitive element and the external photosensitive element are vertically aligned with a light transparent path to provide a photo sensing function. Please refer to FIG. 13b, which is an illustrative diagram of a bottom emission type intelligent sensing touch display device having a photosensitive element integrated into a display layer, and an external photosensitive element and an electromagnetic sensing element (or a pressure sensing element or a sound wave sensing element) attached with the top side of the intelligent sensing touch display device, where both the photosensitive element and the external photosensitive element are vertically aligned with a light transparent path to provide a photo sensing function.

Figure 14:
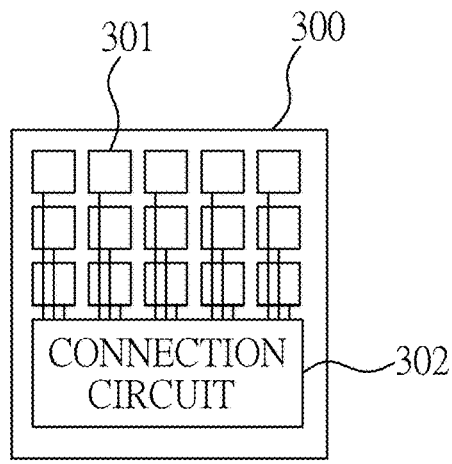
FIG. 14 illustrates another embodiment of the present invention, which further includes a connection circuit for connecting a plurality of the first electrodes to form a combined AC path touch sensing unit.

In a possible embodiment, as illustrated in FIG. 14, the present invention further includes a connection circuit 302 for connecting a plurality of the first electrodes 301 to form a combined AC path touch sensing unit under a control of the touch and display driving unit 330 (not shown in FIG. 14).

Figure 15:
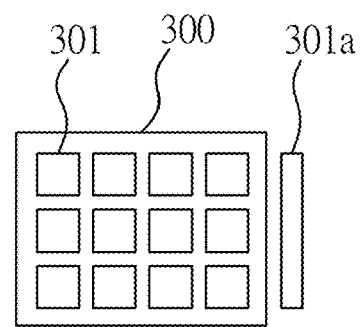
FIG. 15 illustrates another embodiment of the present invention, which further includes at least one side electrode neighboring the first electrode group for cooperating with the first electrode group to provide a mutual-capacitance touch detection mode, or an electrostatic field sensing mode.

In a possible embodiment, as illustrated in FIG. 15, the present invention further includes at least one side electrode 301a neighboring the first electrode group 300 for cooperating with the first electrode group 300 to provide a mutual-capacitance touch detection mode, or an electrostatic field sensing mode.

Figure 16A:
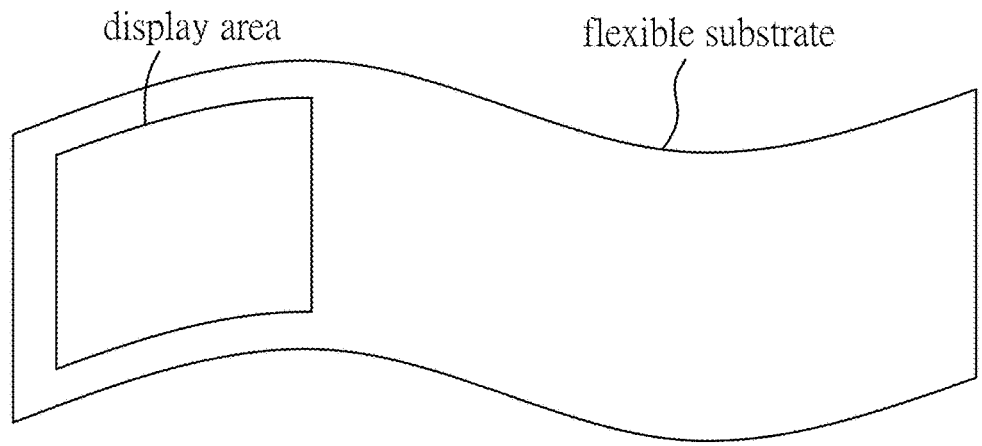
FIG. 16a illustrates another embodiment of the present invention, in which the first plane and the second plane are provided by two flexible substrates and a local display area is formed on the flexible substrates.
Figure 16B:
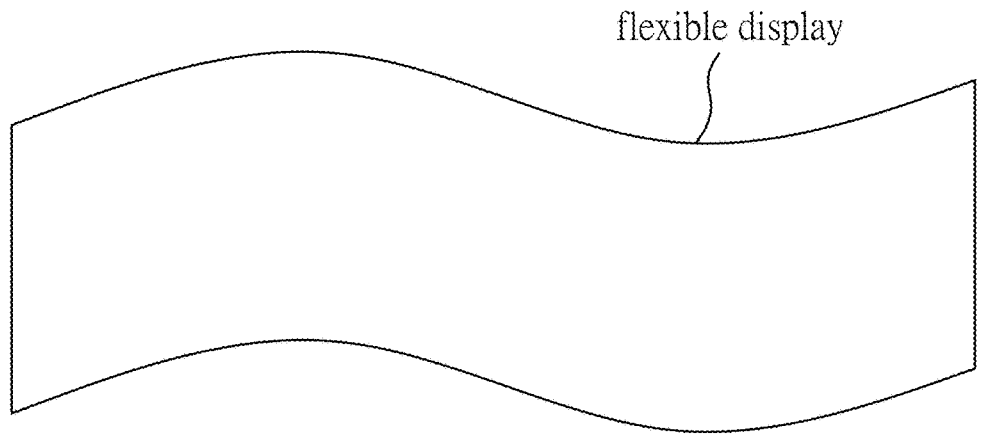
FIG. 16b illustrates another embodiment of the present invention, in which the first plane and the second plane are provided by two flexible substrates and a whole display area is formed on the flexible substrates.

In a possible embodiment, as illustrated in FIG. 16a and FIG. 16b, the first plane and the second plane are provided by two flexible substrates, the flexible substrate being a flexible PI substrate or a flexible PET substrate, so that the intelligent sensing touch display device is a flexible touch display device. Besides, as shown in FIG. 16a, a local display area can be formed on the flexible substrates, or as shown in FIG. 16b, a whole area for display can be formed on the flexible substrates.

Figure 17:
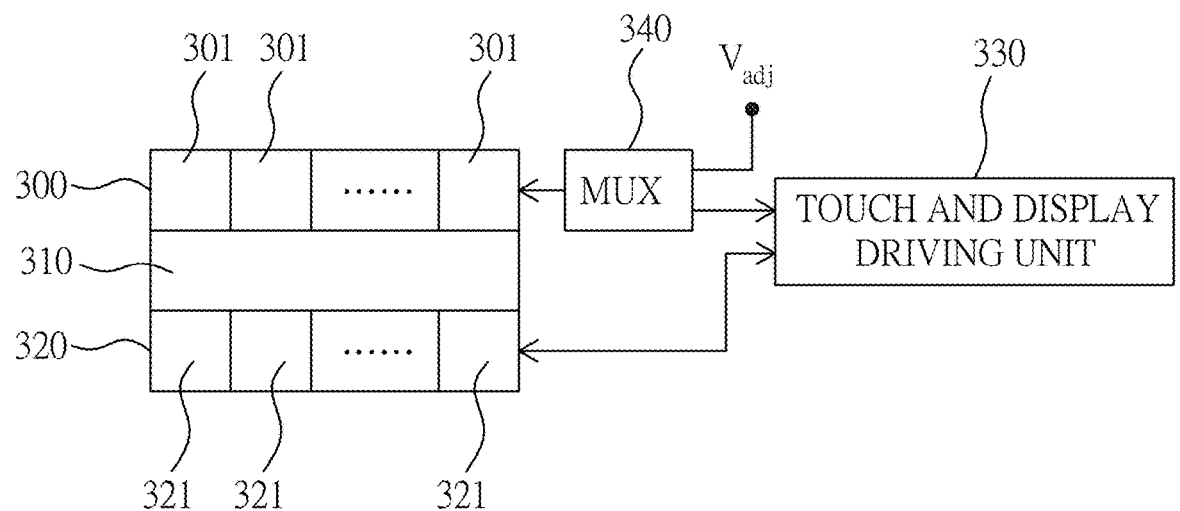
FIG. 17 illustrates another embodiment of the present invention, where the intelligent sensing touch display device further includes at least one multiplexer for connecting at least one first electrode unit to at least one adjustable power source or to the touch and display driving unit.

Besides, as can be seen in FIG. 17, the intelligent sensing touch display device of the present invention can further include at least one multiplexer 340 for connecting at least one first electrode unit 301 to at least one adjustable power source $V_{adj}$ or to the touch and display driving unit 330, where the at least one adjustable power source $V_{adj}$ can be used for controlling a brightness distribution of a display image.

Figure 18:
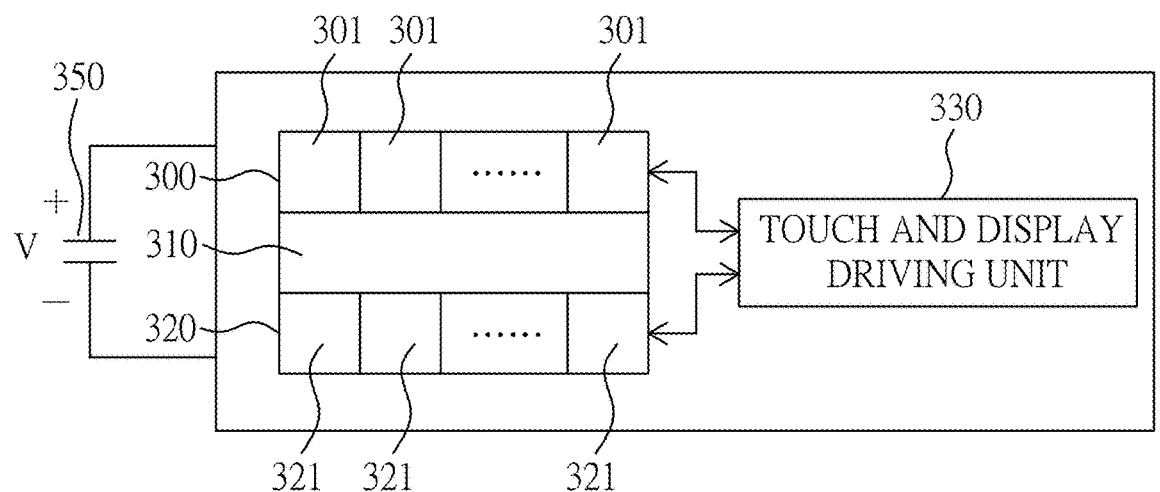
FIG. 18 illustrates still another embodiment of the present invention, where the intelligent sensing touch display device further includes at least one auxiliary capacitor for providing a functional power for the display driving function or the touch sensing function when the intelligent sensing touch display device is disconnected from a power supply.

Besides, as can be seen in FIG. 18, the intelligent sensing touch display device of the present invention can further include at least one auxiliary capacitor 350 for providing a functional power for the display driving function or the touch sensing function when the intelligent sensing touch display device is disconnected from a power supply.

Figure 19:
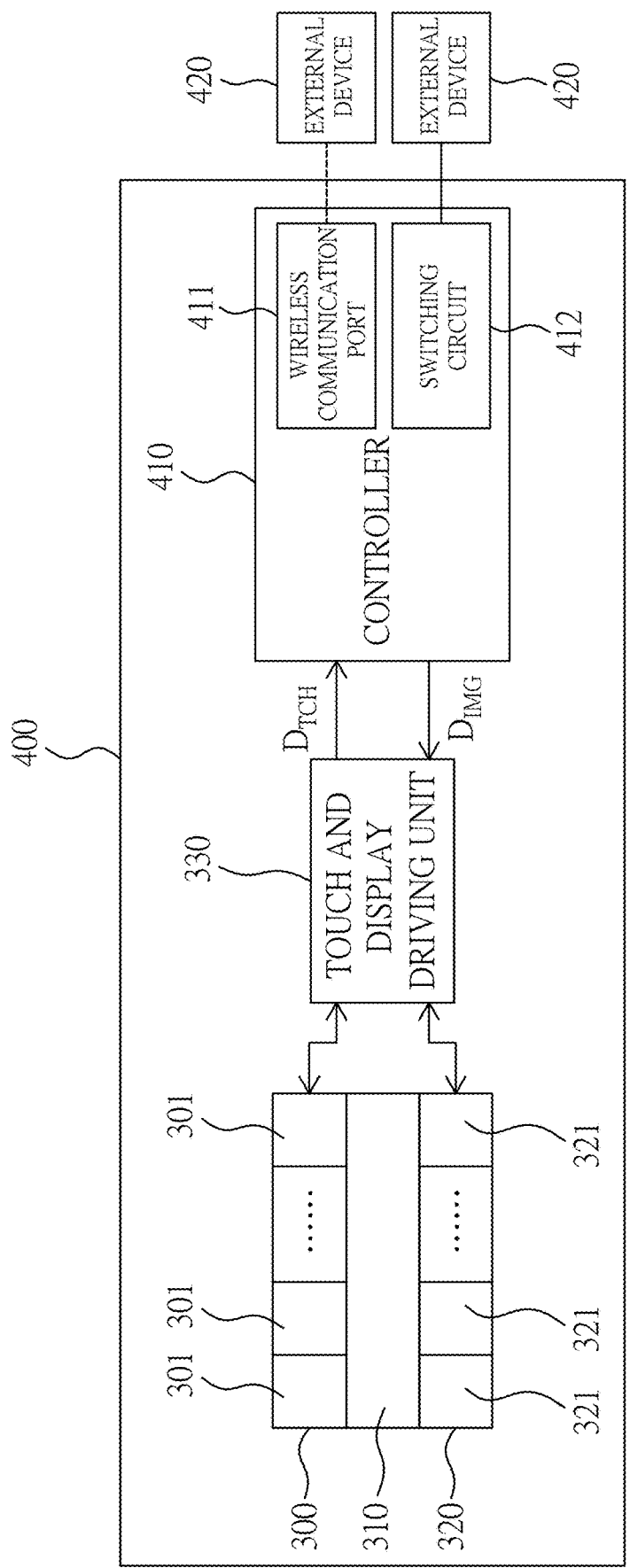
FIG. 19 is an illustrative view of an intelligent sensing touch display device according to an embodiment of the present invention.

Please refer to FIG. 19, which is an illustrative view of an intelligent sensing touch display device according to an embodiment of the present invention. As illustrated in FIG. 19, an intelligent sensing touch display device 400 includes a first electrode group 300 (corresponding to a common voltage layer of a conventional display device), an interface layer 310, an active array unit 320, a touch and display driving unit 330, and a controller 410.

The first electrode group 300 has N first electrodes 301 on a first plane, N being a positive integer; the active array unit 320 has a plurality of second electrode units 321, each second electrode unit 321 having M second electrodes, and each of the M second electrodes being controlled by at least one active switch and opposite to a first electrode 301, M being a positive integer greater than 1; and the interface layer 310, which is a display material layer or a display and touch sensing material layer, is interposed between the first electrode group 300 and the active array unit 320 for being driven by the active array unit 320 in a display procedure to provide a display image.

According to the present invention, the touch and display driving unit 330 is coupled with the first electrode group 300 and the active array unit 320 for responsive to an application program to selectively perform a first touch detection procedure on the first electrode group 300, or performing a second touch detection procedure on the active array unit 320, or performing the first touch detection procedure on the first electrode group 300, and then performing the second touch detection procedure on at least one area of the active array unit 320, where the at least one area is determined according to a detection result of the first touch detection procedure. Besides, one first electrode 301 and the M second electrodes form an AC channel touch sensing unit, so that the touch and display driving unit 330 will recognize that the AC path touch sensing unit is touched when any electrode in the AC channel touch sensing unit is touched by a finger.

The controller 410 is coupled with the touch and display driving unit 330, has a wireless communication port 411 and/or a switching circuit 412 for controlling at least one external device 420, and is used for performing a switching control procedure, the switching control procedure including steps of:

(1) receiving information of at least one touched button icon provided by the touch and display driving unit 330;

(2) generating at least one switching command according to the information of at least one touched button icon; and (3) transmitting the at least one switching command via the wireless communication port 411 and/or the switching circuit 412 to control the at least one external device 420.

For possible embodiments, the controller 410 can be integrated with the touch and display driving unit 330 in a COG (chip-on-glass) chip, COF (chip-on-film) chip or COB (chip-on board) chip.

For possible embodiments, the controller 410 can be integrated with a main controller (not shown in the FIG. 19) in a COG chip, COF chip or COB chip, and the main controller can be a CPU (central processing unit) or GPU (graphics processing unit).

For possible embodiments, the controller 410 can be integrated with the touch and display driving unit 330 and a main controller in a COG chip, COF chip or COB chip, and the main controller can be a CPU or GPU.

Figure 20:
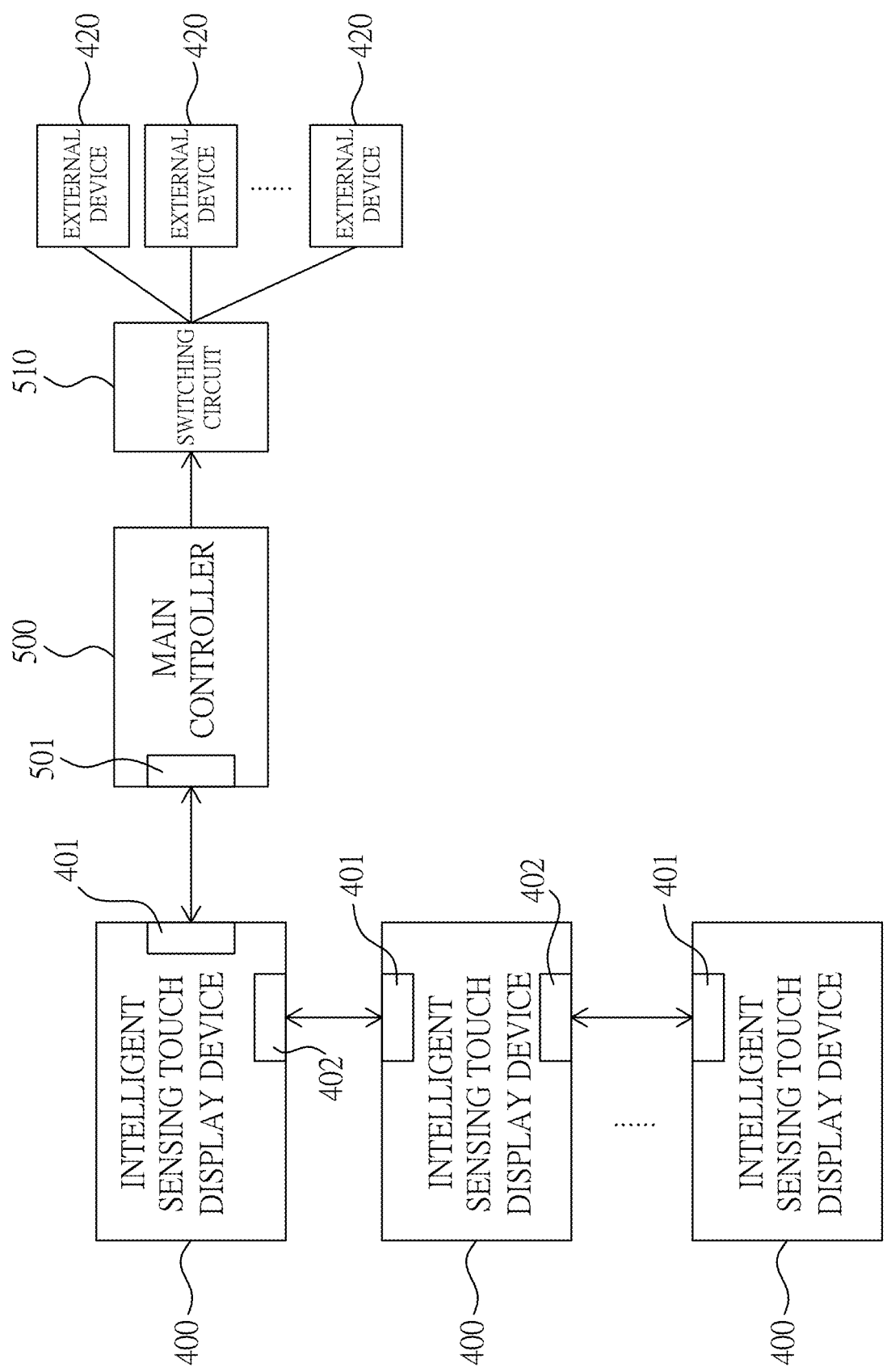
FIG. 20 illustrates a block diagram of an intelligent sensing touch display system according to an embodiment of the present invention.

In light of the design of the FIG. 19, the present invention further proposes an intelligent sensing touch display system. Please refer to FIG. 20, which illustrates a block diagram of an intelligent sensing touch display system according to an embodiment of the present invention. As illustrated in FIG. 20, the intelligent sensing touch display system including a plurality of intelligent sensing touch display devices 400, a main controller 500, and a switching circuit 510 for controlling at least one external apparatus 520.

Each of the intelligent sensing touch display devices 400 has a slave interface 401 and a master interface 402, and the plurality of the intelligent sensing touch display devices 400 are connected in a chain by connecting the master interface 402 of one intelligent sensing touch display device 400 with the salve interface 401 of another intelligent sensing touch display device 400.

The main controller 500 has a master interface 501 coupled with the salve interface 401 of a first intelligent sensing touch display device of the plurality of the intelligent sensing touch display devices 400 for receiving at least one switching command, and driving at least one external apparatus 520 via the switching circuit 510 accordingly.

For possible embodiments, the controller 410 is integrated with the touch and display driving unit 330 in a COG chip, COF chip or COB chip.

For possible embodiments, the main controller 500 can be a CPU or GPU.

Figure 21A:
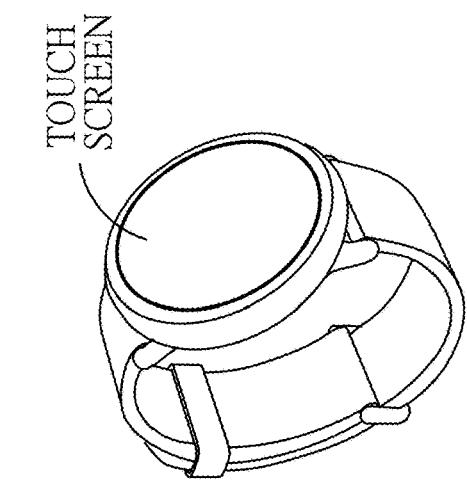
FIG. 21a illustrates a portable computer as an application example of the electronic apparatus of the present invention.
Figure 21B:
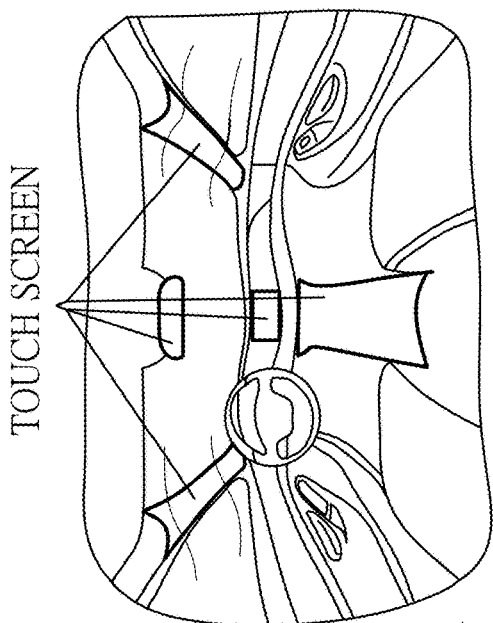
FIG. 21b illustrates a vehicle electronic system as another application example of the electronic apparatus of the present invention.
Figure 21C:
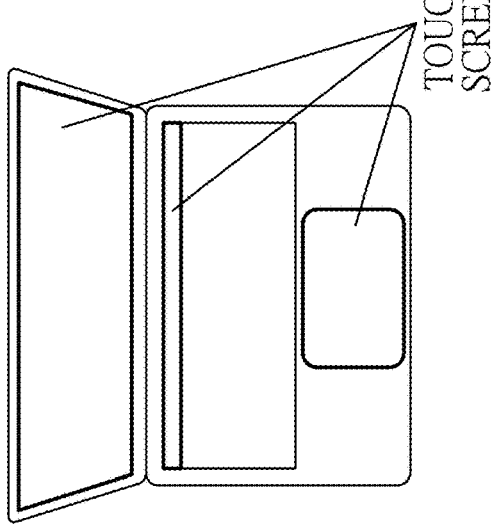
FIG. 21c illustrates an intelligent watch as another application example of the electronic apparatus of the present invention.
Figure 21D:
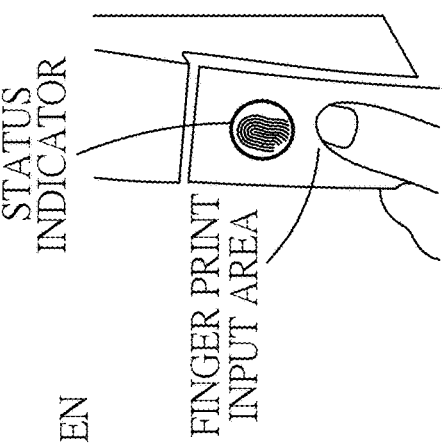
FIG. 21d illustrates a remote controller as another application example of the electronic apparatus of the present invention.
Figure 21E:
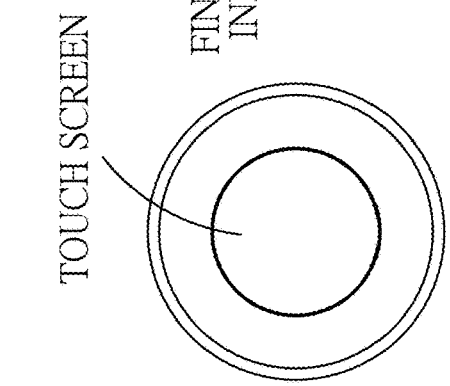
FIG. 21e illustrates a button with display as another application example of the electronic apparatus of the present invention.
Figure 21F:
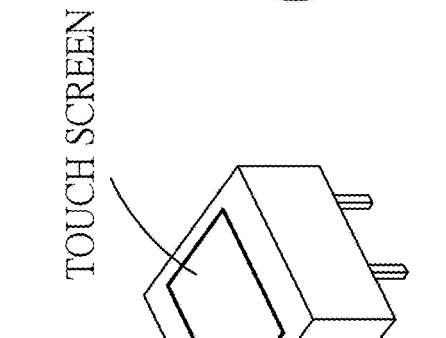
FIG. 21f illustrates an IOT (internet of thing) as another application example of the electronic apparatus of the present invention.
Figure 21G:
FIG. 21g illustrates a fingerprint display as still another application example of the electronic apparatus of the present invention.

In light of the disclosure of the FIG. 19 and FIG. 20, the present invention further proposes an electronic apparatus having the intelligent sensing touch display device as disclosed in FIG. 19 or the intelligent sensing touch display system as disclosed in FIG. 20. Please refer to FIG. 21a, which illustrates a portable computer as an application example of the electronic apparatus of the present invention; FIG. 21b, which illustrates a vehicle electronic system as another application example of the electronic apparatus of the present invention; FIG. 21c, which illustrates an intelligent watch as another application example of the electronic apparatus of the present invention; FIG. 21d, which illustrates a remote controller as another application example of the electronic apparatus of the present invention; FIG. 21e, which illustrates a button with display as another application example of the electronic apparatus of the present invention; FIG. 21f, which illustrates an IOT (internet of thing) as another application example of the electronic apparatus of the present invention; and FIG. 21g, which illustrates a fingerprint display as still another application example of the electronic apparatus of the present invention.

That is, the present invention of FIG. 19 and FIG. 20 can be utilized to implement a smart switching function in many electronic apparatuses having a touch screen or multiple touch screens, and save a lot of energy and many resources of the electronic apparatuses.

Thanks to the schemes disclosed above, the present invention can provide the advantages as follows:

1. The intelligent touch sensing device of the present invention can integrate a high resolution active type sensing structure and a low resolution passive type sensing structure into a touch detection device, so as to perform a first touch detection procedure and/or a second touch detection procedure as optionally required by an application program.

2. The intelligent touch sensing device of the present invention can provide fingerprint data or fingerprint characteristic data.

3. Another objective of the present invention is to disclose an intelligent touch sensing device, which is capable of providing sensed pressure data.

4. The intelligent touch sensing device of the present invention can utilize existing control lines, signal lines, transistor switches, pixel electrodes, and counter electrodes of a matrix display structure to perform a touch detection procedure, thereby providing a high yield rate and low cost touch sensing device.

5. The intelligent touch sensing device of the present invention can provide a joystick style operation zone within a touch detection area.

6. The intelligent touch sensing device of the present invention can be implemented in a form of a curved touch sensing device or a flexible or foldable touch sensing device by utilizing a manufacturing process for organic transistors and a flexible substrate.

7. The intelligent sensing touch display device of the present invention can provide a variety of touch display modes according to requirements of different application programs.

8. The intelligent sensing touch display device of the present invention can provide an AC channel touch sensing unit consisting of plural discrete electrodes, where when any electrode of the plural discrete electrodes in the AC channel touch sensing unit is touched by a finger, a signal will be detected by a touch and display driving unit to indicate that the AC path touch sensing unit is touched.

9. The intelligent sensing touch display device of the present invention can provide a flexible touch display surface by using a flexible substrate to carry discrete electrodes of a common voltage layer.

10. The intelligent sensing touch display device of the present invention can provide a functional power for a display driving function or a touch sensing function by using at least one auxiliary capacitor when the intelligent sensing touch display device is disconnected from a power supply.

11. The intelligent sensing touch display device of the present invention can use adjustable power sources to control a brightness distribution of a display image by connecting the adjustable power sources with discrete electrodes of a common voltage layer.

12. The intelligent sensing touch display device of the present invention can facilitate integration of one or more sensing elements of the group consisting of photosensitive element, electromagnetic sensing element, pressure sensing element and sound wave sensing element into or with the intelligent sensing touch display device.

13. The intelligent sensing touch display device of the present invention can provide a smart switching function save much energy and many processing resources of a main controller.

14. The intelligent sensing touch display device of the present invention can save much energy and many processing resources of a touch and display driving unit.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. An intelligent sensing touch display device, comprising:
   a first electrode group having N first electrodes on a first plane, N being a positive integer;
   an interface layer, which is a display material layer or a display and touch sensing material layer, located below the first electrode group for providing a display area on the display material layer, or providing a display area and at least one touch sensing area on the display and touch sensing material layer;
   an active array unit having N second electrode units on a second plane located below the display material layer, each of the second electrode units having M second electrodes, each of the M second electrodes being controlled by at least one active switch and opposite to one said first electrode, M being a positive integer greater than 1, wherein when the interface layer is the display material layer, each of the second electrodes is used as a display electrode or a touch sensing electrode, and when the interface layer is the display and sensing material layer, a part of the second electrodes are used as display electrodes or touch sensing electrodes, and another part of the second electrodes are used as the touch sensing electrodes, the touch sensing electrode being a capacitive electrode, a photosensitive electrode, or a thermal sensing electrode; and
   a touch and display driving unit coupled with the first electrode group and the active array unit for generating voltage signals or current signals to drive the interface layer to provide a display image, and/or for being responsive to an application program to selectively perform a first touch detection procedure on the first electrode group, or performing a second touch detection procedure on the active array unit, or performing the first touch detection procedure on the first electrode group, and then performing the second touch detection procedure on at least one area of the active array unit, wherein the at least one area is determined according to a detection result of the first touch detection procedure;
   wherein a controller is coupled with the touch and display driving unit, the controller has a wireless communication port and/or a switching circuit for controlling at least one external device, and is used for performing a switching control procedure, the switching control procedure including steps of: receiving information of at least one touched button icon provided by the touch and display driving unit; generating at least one switching command according to the information of at least one touched button icon; and transmitting the at least one switching command via the wireless communication port and/or the switching circuit to control the at least one external device.

2. The intelligent sensing touch display device as disclosed in claim 1, wherein the controller is integrated with the touch and display driving unit in a chip selected from a group consisting of COG chip, COF chip and COB chip.

3. The intelligent sensing touch display device as disclosed in claim 1, wherein the controller is integrated with a main controller in a chip selected from a group consisting of COG chip, COF chip and COB chip, and the main controller is a CPU or GPU.

4. The intelligent sensing touch display device as disclosed in claim 1, wherein the controller is integrated with the touch and display driving unit and a main controller in a chip selected from a group consisting of COG chip, COF chip and COB chip, and the main controller is a CPU or GPU.

5. An intelligent sensing touch display system, comprising:
   a plurality of the intelligent sensing touch display devices as disclosed in claim 1, wherein each of the intelligent sensing touch display devices has a master interface and a slave interface, and the plurality of the intelligent sensing touch display devices are connected in a chain by connecting the master interface of one said intelligent sensing touch display device with the salve interface of another said intelligent sensing touch display device; and
   a main controller, coupled with a first intelligent sensing touch display device of the plurality of the intelligent sensing touch display devices for receiving at least one said switching command, and driving at least one external apparatus accordingly.

6. The intelligent sensing touch display system as disclosed in claim 5, wherein the controller is integrated with the touch and display driving unit in a chip selected from a group consisting of COG chip, COF chip and COB chip.

7. The intelligent sensing touch display system as disclosed in claim 5, wherein the main controller is a CPU or GPU.

8. An electronic apparatus comprising the intelligent sensing touch display device as disclosed in claim 1, wherein the electronic apparatus is selected from a group consisting of a portable computer, a vehicle electronic system, an intelligent watch, a remote controller, a button with display, an IOT, and a fingerprint display.

9. An electronic apparatus comprising the intelligent sensing touch display device as disclosed in claim 2, wherein the electronic apparatus is selected from a group consisting of a portable computer, a vehicle electronic system, an intelligent watch, a remote controller, a button with display, an IOT, and a fingerprint display.

10. An electronic apparatus comprising the intelligent sensing touch display device as disclosed in claim 3, wherein the electronic apparatus is selected from a group consisting of a portable computer, a vehicle electronic system, an intelligent watch, a remote controller, a button with display, an IOT, and a fingerprint display.

11. An electronic apparatus comprising the intelligent sensing touch display device as disclosed in claim 4, wherein the electronic apparatus is selected from a group consisting of a portable computer, a vehicle electronic system, an intelligent watch, a remote controller, a button with display, an IOT, and a fingerprint display.

12. An electronic apparatus comprising the intelligent sensing touch display system as disclosed in claim 5, wherein the electronic apparatus is selected from a group consisting of a portable computer, a vehicle electronic system, an intelligent watch, a remote controller, a button with display, an IOT, and a fingerprint display.

13. An electronic apparatus comprising the intelligent sensing touch display system as disclosed in claim 6, wherein the electronic apparatus is selected from a group consisting of a portable computer, a vehicle electronic system, an intelligent watch, a remote controller, a button with display, an IOT, and a fingerprint display.

14. An electronic apparatus comprising the intelligent sensing touch display system as disclosed in claim 7, wherein the electronic apparatus is selected from a group consisting of a portable computer, a vehicle electronic system, an intelligent watch, a remote controller, a button with display, an IOT, and a fingerprint display.

* * * * *